United States Patent [19]

Davis, II et al.

[11] Patent Number: 4,680,728
[45] Date of Patent: Jul. 14, 1987

[54] USER-FRIENDLY TECHNIQUE AND APPARATUS FOR ENTERING ALPHANUMERIC DATA THROUGH A NUMERIC KEYBOARD

[75] Inventors: William N. Davis, II, Centerville; Ruth E. Nash, Kettering, both of Ohio

[73] Assignee: NCR Corporation, Dayton, Ohio

[21] Appl. No.: 661,548

[22] Filed: Oct. 17, 1984

[51] Int. Cl.$^4$ ............................................. G06F 3/03
[52] U.S. Cl. .................................... 364/900; 340/711; 340/365 R
[58] Field of Search .................... 340/365 R, 711; 364/200 MS File, 900 MS File

[56] References Cited

U.S. PATENT DOCUMENTS

| | | | |
|---|---|---|---|
| 4,185,282 | 1/1980 | Pick | 340/711 |
| 4,313,108 | 1/1982 | Yoshida | 340/365 |
| 4,333,097 | 6/1982 | Buric | 340/711 |
| 4,522,518 | 6/1985 | Schmidt | 340/365 R |

FOREIGN PATENT DOCUMENTS

| | | | |
|---|---|---|---|
| 0101211 | 8/1984 | European Pat. Off. | 340/711 |
| 2134293 | 8/1984 | United Kingdom | |

*Primary Examiner*—Archie E. Williams, Jr.
*Assistant Examiner*—Emily Yue Chan
*Attorney, Agent, or Firm*—Wilbert Hawk, Jr.; Albert L. Sessler, Jr.; Elmer Wargo

[57] ABSTRACT

A process and apparatus for entering a predetermined number of characters use an entry terminal having a display and a keyboard having a predetermined number of character entry keys presented in a first array (ten key numeric keyboard) and a predetermined number of function keys, with the predetermined number of character entry keys being fewer in number than the predetermined number of characters. The process comprises the steps of presenting on the display more than one cluster of characters to be selected, with each cluster containing fewer than the predetermined number of characters, and with each cluster of characters being presented on the display in a second array; selecting, via a function key, one of the clusters of characters which contains the character to be entered via the terminal; and actuating one of the character entry keys whose position in the first array bears a predetermined relationship with the position in the second array held by the character to be entered. The characters in the clusters include function symbols which can be selected to perform editing functions.

1 Claim, 11 Drawing Figures

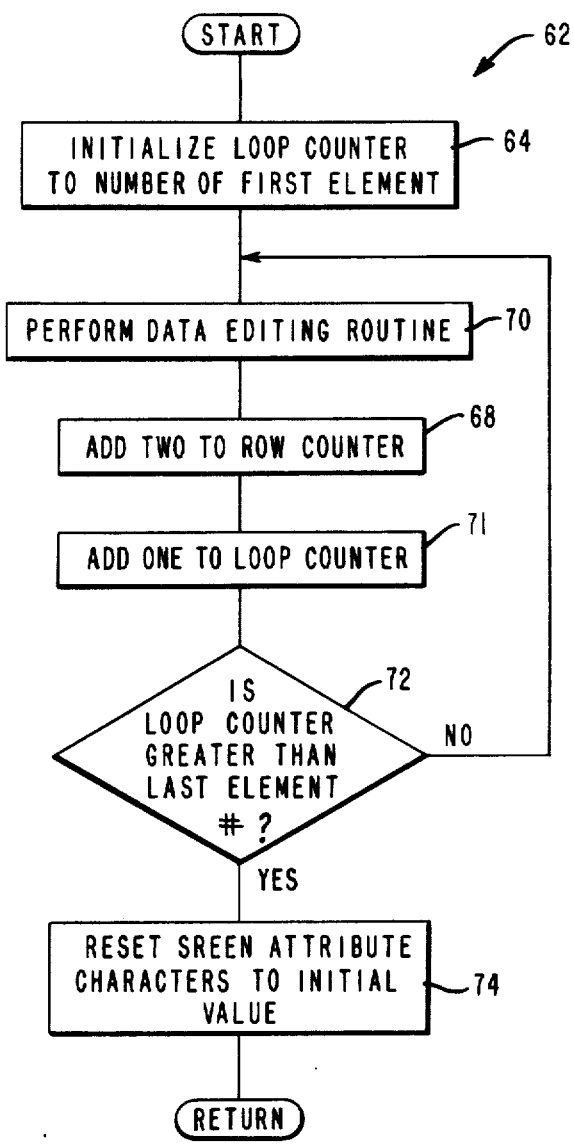

USER-FRIENDLY TECHNIQUE AND APPARATUS FOR ENTERING ALPHANUMERIC DATA THROUGH A NUMERIC KEYBOARD

BACKGROUND OF THE INVENTION

This invention relates to a process and apparatus for entering alphanumeric data on a data entry terminal which has only a numeric keyboard plus a few function keys provided for data entry functions.

One of the prior-art ways of utilizing a numeric keyboard of a terminal in order to enter alpha-numeric data is to utilize one of the associated function keys along with one of the keys on the numeric keyboard to enter one of the alphanumerics. This method requires that two keys be actuated at the same time by an operator.

In the English language, there are about sixty alphanumerics used in a typical application, counting 26 upper-case letters, 10 numbers, and about 24 characters for punctuation and other marks. Because there are only ten numeric keys in the example described, at least six separate function keys would be required to enter any one of the sixty alphanumerics mentioned by the two-key-entry method illustrated. This method of operation requires, generally, that the numeric keys be marked in some way to indicate their multi-character functions. Such a system of entering data is cumbersome and is not considered "user-friendly". A user-friendly terminal is one which was designed so as to minimize the problems which a not-too-sophisticated user of the terminal would encounter.

Certain terminals in the data processing industry were initially designed to handle only numeric data input, and now, efforts are being made to extend the capabilities of these terminals through introducing the ability, for example, to change alphanumeric data appearing on the displays in these terminals. For example, the NCR 5062 terminal is a terminal which is manufactured by and currently available from the NCR Corporation of Dayton, Ohio. The NCR 5062 terminal is a consumer or customer-activated electronic funds transfer (EFT) terminal which is found in grocery supermarkets and financial institutions, for example. This terminal provides a low-cost way of obtaining functions that are usually performed on a more expensive, automatic teller machine (ATM), functions such as financial account inquiries and transfers from one account to another. The NCR 5062 terminal has only a ten-key keyboard for entering numbers 0–9, and it also has only three function keys thereon, namely "clear", "cancel", and "enter". In terminals like the NCR 5062 terminal, certain alphanumeric messages are displayed on the cathode ray tube (CRT) or display of the terminal. Some of these messages are instructional, providing lead-through instructions for operating the terminal, and other messages are promotional. It would be extremely useful if the capability of the terminal were extended to permit changing the promotional messages, for example, on the display, while using the existing 10 key numeric keyboard and a few function keys.

SUMMARY OF INVENTION

In one aspect of this invention, this invention relates to a process for entering characters from a predetermined number of characters using an entry terminal having a display and also having a keyboard having a predetermined number of character entry keys presented in a first array and a predetermined number of function keys, with said predetermined number of character entry keys being fewer in number than said predetermined number of characters; said process comprising the steps: (a) presenting on said display more than one cluster of characters to be selected, with each said cluster containing fewer than said predetermined number of characters, each said cluster of characters being presented on said display in a second array; (b) selecting, via a said function key, that one of said clusters of characters which contains the character to be entered via said terminal; and (c) actuating that one of said character entry keys whose position in said first array bears a predetermined relationship to the position in said second array occupied by the character to be entered from step b.

In another aspect of this invention, this invention relates to a data entry terminal for entering characters from a predetermined number of characters comprising: a display; a keyboard having a predetermined number of character entry keys presented in a first array and also having a predetermined number of function keys; said predetermined number of character entry keys being fewer in number than said predetermined number of characters; means for presenting on said display more than one cluster of characters, with each said cluster containing fewer than said predetermined number of characters, each said cluster of characters being presented on said display in a second array; means for coupling at least one of said function keys and said presenting means to enable the selecting of that one of said clusters which contains the character to be entered on said data entry terminal; and second means for coupling said character entry keys with said presenting means to enable the selecting of said character to be emtered from the cluster selected by said one of said function keys by actuating that one of said character entry keys whose position in said first array bears a predetermined relationship to the position in said second array occupied by said character to be entered.

An object of this invention is to develop a user-friendly technique for entering alphanumeric data which technique avoids the problem of having to actuate two keys at a time to enter a character.

Another object of this invention is to develop a low-cost technique and apparatus for entering alphanumeric character strings while using only 13 keys.

These objects and others will be more readily understood in connection with the following description, claims and drawing.

BRIEF DESCRIPTION OF THE DRAWING

FIG. 6 is a flow chart showing the general steps included in the "Perform edit loop" step shown in FIG. 3;

DESCRIPTION OF THE PREFERRED EMBODIMENT

Figure 1:
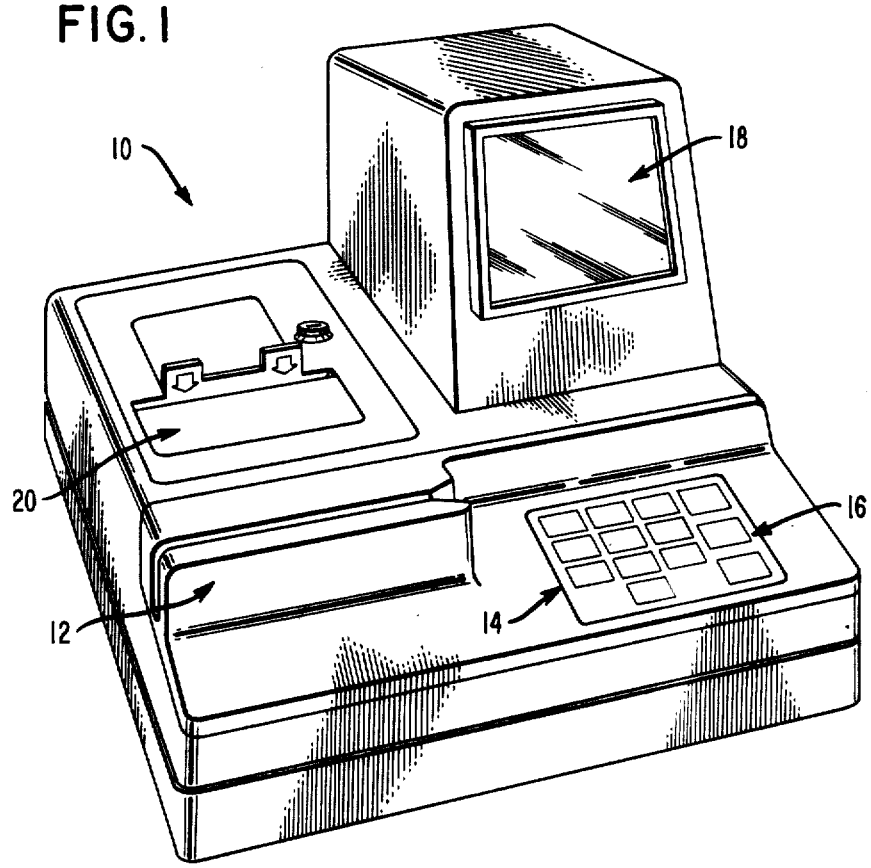
FIG. 1 is a general view, in perspective, showing a typical terminal having a ten-key, numeric keyboard and a few function keys, and also having a display for providing communication with a user of the terminal in which this invention may be incorporated.

FIG. 1 is a general, perspective view of a typical terminal 10 in which this invention may be incorporated and practiced. The terminal 10 includes: a magnetic card reader 12 which is used to identify the user of the terminal and the user's account number, etc.; a 10 key numeric keyboard 14 with a group of function keys 16 thereon; a display 18 such as a cathode ray tube (CRT) for communicating with the user; and a printer 20 for printing receipts and printing on financial "passbooks," for example. The terminal 10 displayed is a customer-activated, electronic-funds-transfer terminal of the type mentioned earlier herein; however, this invention may be practiced in association with any terminal which has a numeric keyboard, a few function keys, and a display, and it is desired to enter alphanumerics from a ten-key keyboard. In a broader aspect, this invention may be used whenever it is desired to display or print a number of characters which is greater than the number of keys which exist on the associated input device or keyboard.

Figure 2:
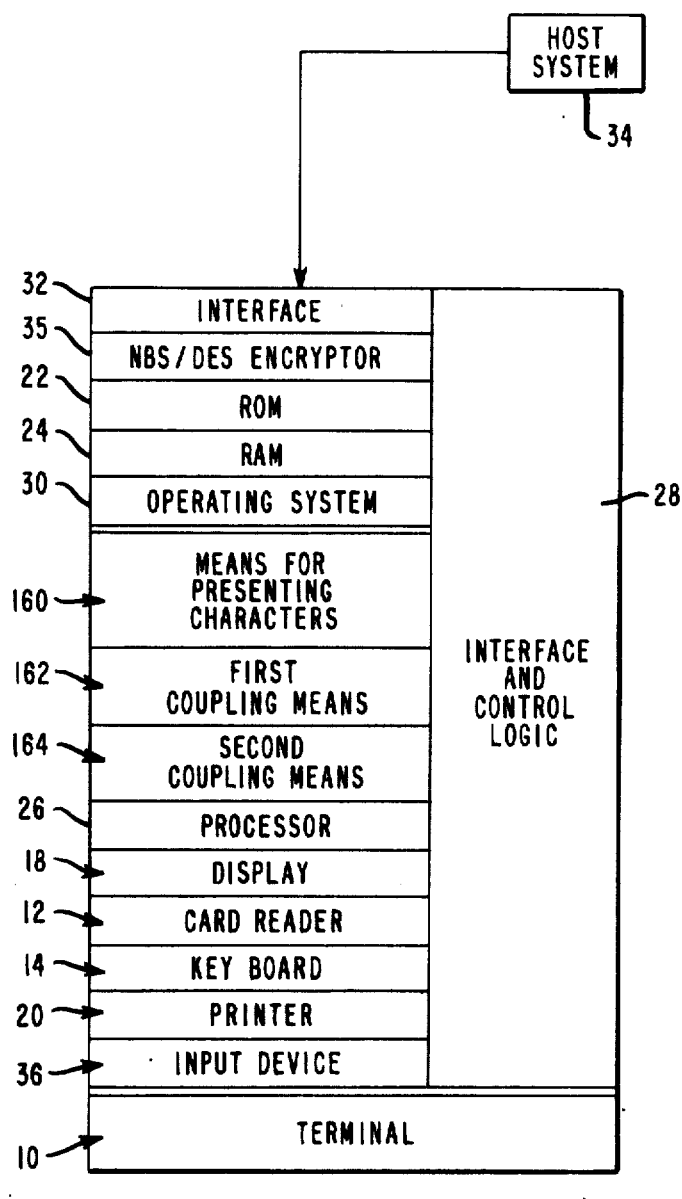
FIG. 2 is a general schematic diagram, in block form, showing how this invention is incorporated in the terminal shown in FIG. 1.

FIG. 2 is a schematic diagram, in block form, showing the terminal 10 in which this invention may be incorporated. It seems appropriate to discuss, first, those elements of the terminal 10 which are conventional.

As seen from FIG. 2, the terminal 10 includes the card reader 12, keyboard 14 (which includes the function keys 16 shown in FIG. 1), display 18, and printer 20 which have been discussed in relation to FIG. 1. the operating system for the terminal 10 may reside in the read only memory (ROM) 22 or it may be loaded daily into the random acces memory (RAM) 24 as is typically done. The terminal 10 also includes a processor 26 (which is typically a microprocessor) which is coupled to all the elements shown in FIG. 2 by conventional interface and control logic 28 to enable the processor 26 to execute the instructions in the operating system shown as 30 and to enable the terminal 10 to function as what is referred to as an intelligent terminal. The terminal 10 also has an interface 32 which enables the terminal 10 to communicate with a host system 34. The terminal 10 may also have an input device 36, such as a tape cassette reader, which enables certain data, instructions, etc. to be entered into the terminal, or the input device may be an input jack which couples the terminal 10 to an external cassette reader. The terminal 10 may also have an encryptor 35 which utilizes the National Bureau Standards/Data Encryption Standard (NBS/DES) for encrypting data as is typically done. Those elements which have been described so far in relation top FIG. 2 represent known elements which function in a conventional way; therefore, further discussion of these elements is not deemed necessary.

Certain lead-through messages appear on the display 18 (FIG. 1) to instruct the user as to how to operate the terminal 10, and also, certain promotional messages appear on the display 18 when the terminal is not in active use as previously mentioned. Typically, when changes are to be made in the promotional messages, for example, the changes are entered into the terminal 10 from the host system 34 or from the input device 36, for example, the present invention enables such messages to be changed using the numeric keyboard 14 and the function keys 16.

The present invention may be incorporated in the operating system 30 of a terminal 10 when that terminal is manufactured, or the invention may be included as part of an application program which is sold separately. The invention could be incorporated or intercoupled with an application program, and the combined program could be incorporated on a magnetic tape, for example. Thereafter, the contents of the magnetic tape would be transferred to the terminal 10 via the input device 36; generally there are sufficient residual programs within the operating system 30 of the terminal 10 to enable the terminal 10 to handle the data received and to place the combined program in the RAM 24 from where the invention may be practiced.

Figure 3:
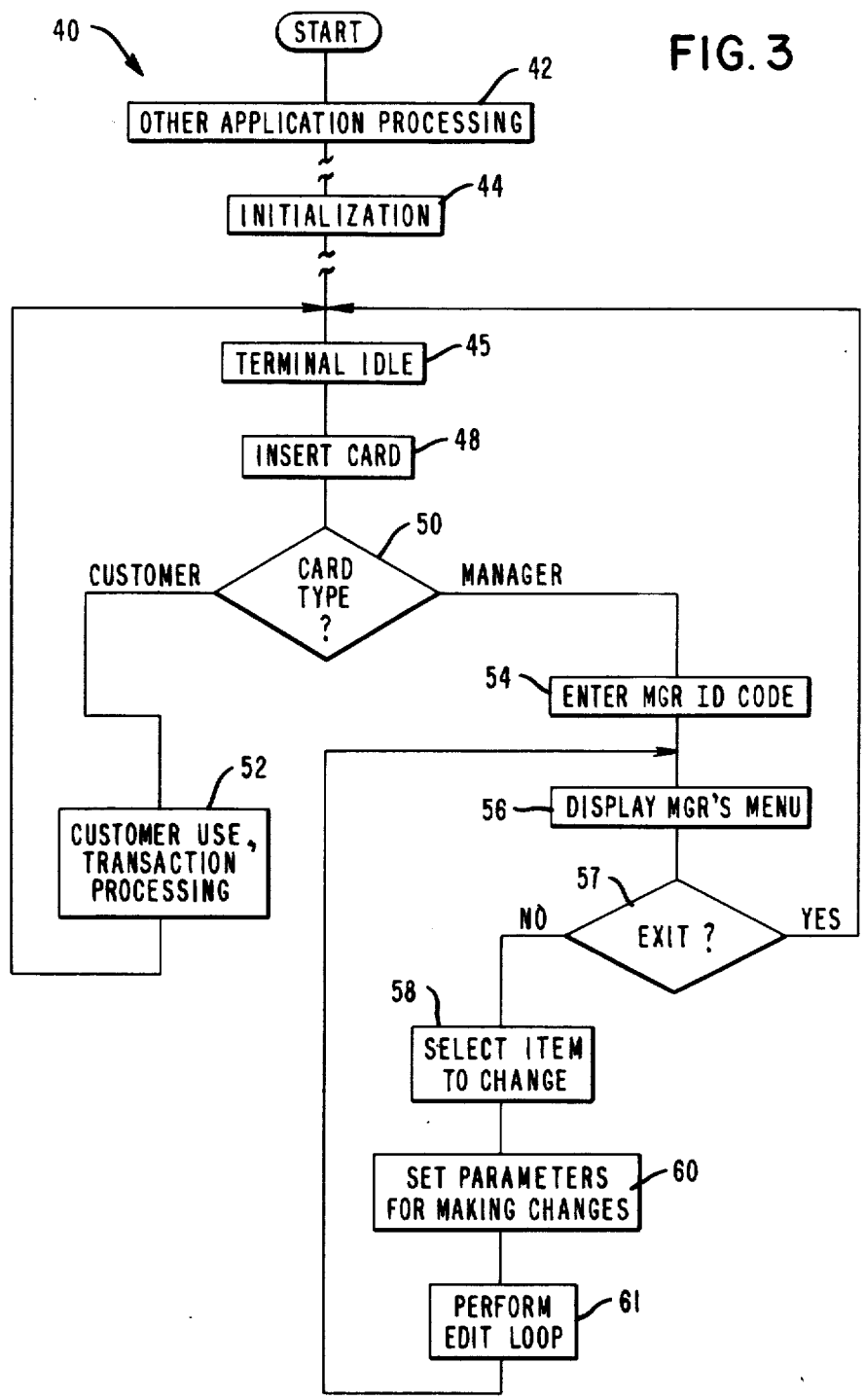
FIG. 3 is a general flow chart showing the broad steps included in a preferred embodiment of this invention.

As previously stated, this invention may be incorporated in a variety of terminals; however, the terminal 10 which is selected to portray this invention is one which performs electronic funds transfer and answers inquiries with regard to check verification and credit authorization, for example. In this regard, FIG. 3 shows a general flow chart or process 40 by which this invention may be practiced.

The process 40 (FIG. 3) includes a block 42 which represents the application processing which is typically performed on the terminal as previously described. Block 44 represents the intialization procedures which are performed to ready the particular terminal 10 for performing the process according to this invention. In this regard, a detailed program listing is provided as an appendix to this description, and when specific reference to the program listing is desired, specific lines of the listing will be referred to. The program listing is written in NCR Basic language which is currently available from the NCR Corporation at Dayton, Ohio.

The initialization procedures referred to in block 44 (FIG. 3) include the following steps, along with their associated references to specific lines of the program listing:

1. Define the array for the data to be edited; see lines 5000 through 5550.

2. Define the key string; see line 1850.

3. Define the key cluster and function key display data; see lines 18650 through 18850.

4. Define and initialize video attribute bytes and attribute array; see lines 3700 through 3910.

Some explanation of each of the steps 1-4 in the initialization procedures referred to in block 44 appears appropriate. Step 1 on lines 5000 through 5200 refer to promotional messages which are displayed on the display 18 of the terminal. For example, if the terminal 10 is located in a grocery store, these promotional messages can be displayed when the terminal is not in active use by a customer. For example, line 5100 has a code key of (1) and the particular message desplayed is "Ground Round—$1.79", which means "Ground round steak is $1.79 per pound". If there is a price change, for example, or a change in the meat to be put on special, the manager of the grocery store in which the terminal is located may edit this message as will be described herinafter. Lines 5250 through 5550 indicate other messages which can be displayed or printed.

Figure 5:
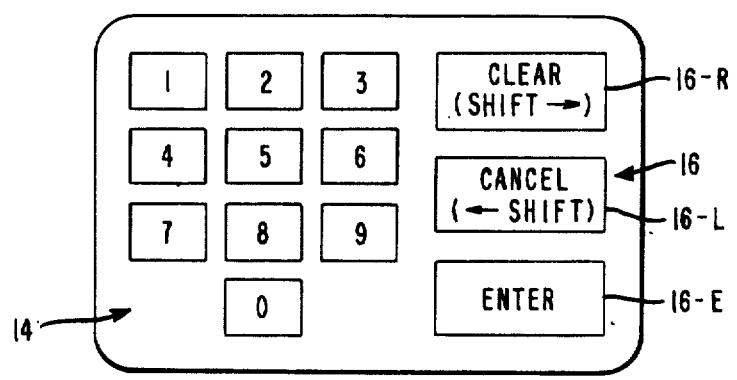
FIG. 5 is an enlarged, schematic showing of the keyboard shown in FIG. 1.
Figure 4:
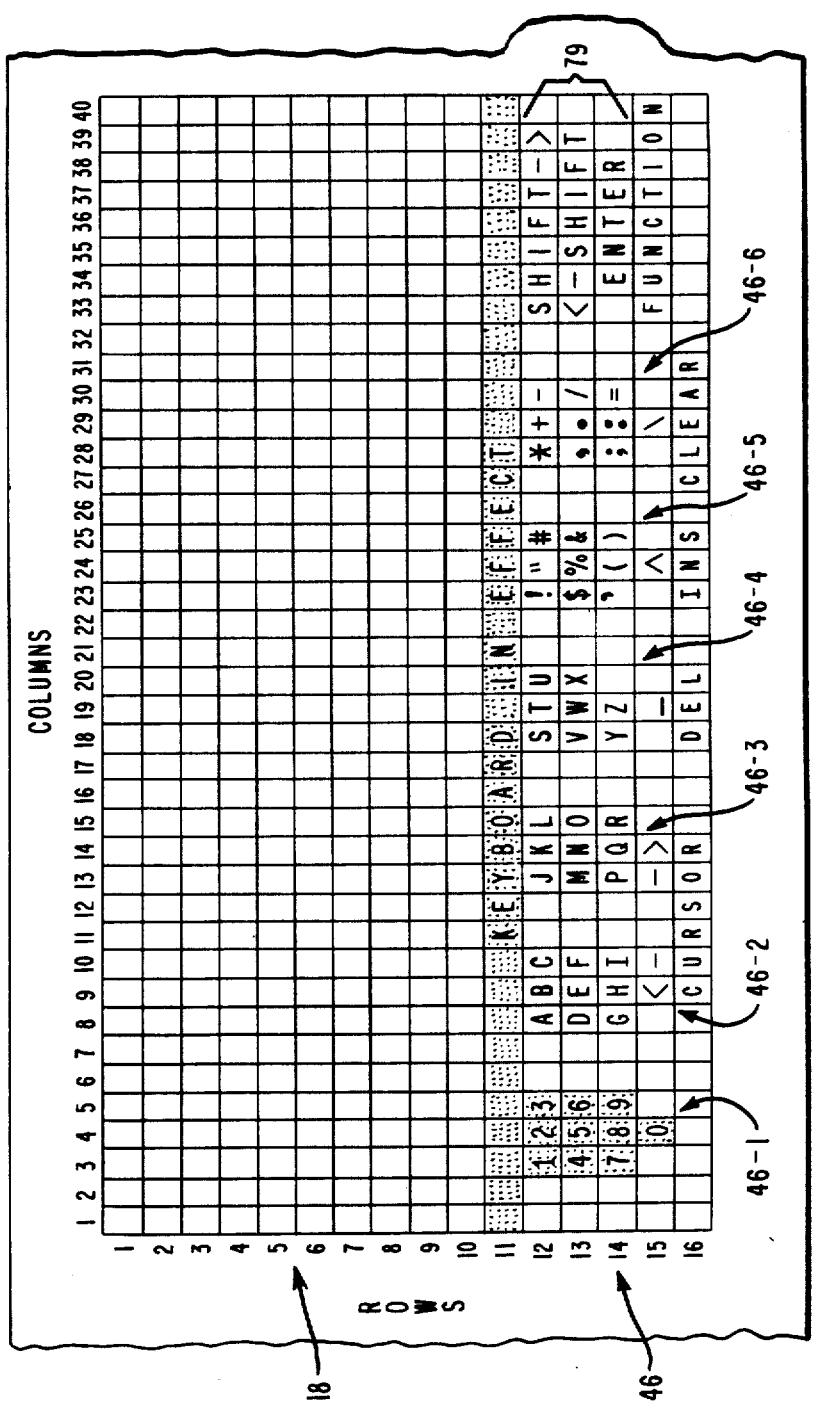
FIG. 4 is an enlarged view of the display associated with the terminal shown in FIG. 1; this display shows clusters of characters which can be selected using a ten-key keyboard associated with the terminal.

Step 2 of the intialization procedures associated with block 44 (FIG. 3) refers to line 1850 of the program listing. This line 1850 refers to the characters in the clusters of characters which are shown on the display 18, and FIG. 4 shows an enlarged, diagrammatic view of the display 18. In the particular embodiment described, the display 18 has a capacity for displaying forty columns and 16 rows of data although this could be changed for different applications. Notice that there are six clusters of characters (which are generally identified as 46) which are displayed on the lower portion of the display 18, with these clusters being specifically identified as 46-1, 46-2, 46-3, 46-4, 46-5, and 46-6. Notice also that FIG. 5 shows an enlarged, diagrammatic plan view of the keyboard 14 and the function keys 16 associated with the terminal 10. Notice also that the cluster 46-1 corresponds to the layout of the keys 0-9 on the keyboard 14; although this is not absolutely necessary for this invention, it does facilitate the entry of data as will be described hereinafter. When looking at line 1850 of the program listing and FIG. 4, one can see that the numbers 0 to 9 comprise the cluster of characters 46-1; the mark < and the letters A through I comprise the cluster 46-2; the mark > and letters J through R comprise the cluster 46-3; etc. The particualr arrangement of characters in the clusters 46 was designed to facilitate the use of certain symbols which are used for editing; this aspect will be discussed in more detail hereinafter.

Step 3 of the initialization procedures associated with block 44 (FIG. 3) refers to lines 18650 through 18850 of the program listing; these lines refer to defining the key clusters and function keys. These lines of the listing define the bottom six lines or rows 11-16 of information on the display 18 (FIG. 4), and they are associated with a concept which is important to this invention. This concept is termed "Keyboard In Effect" as shown in row 11 for the display 18. The keyboard in effect means that at a particular time only one of the clusters 46 of characters shown on the display 18 will be active. To indicate what particular cluster 46 of characters is active, a high-lighting technique is used, and in the embodiment described, a "reverse video" technique is used for this purpose although a "flashing attribute" technique could also be used. This is shown in FIG. 4 by making the background of the selected or active cluster of 46-1 of characters darker than the remaining five clusters which are not active. An important feature of this invention is the use of the display 18 to highlight or feature that cluster 46 of characters which is active on the keyboard. For example, when the cluster 46-1 of characters is highlighted, it means that when the key #5 on the keyboard 14 is actuated, the number 5 will be entered into the terminal 10. Correspondingly, when the cluster 46-2 of characters is highlighted or "active" on the display 18, it means that the character "E" will be entered into the terminal 10 when the key #5 on the keyboard 14 is actuated. For the moment, it is sufficient to state that the "clear" key, 16-R (FIG. 5), is used to select the cluster of characters by shifting the "keyboard in effect" to the right by one cluster position, and correspondingly, the "cancel" key, 16-L (FIG. 5), is used to select the cluster of characters by shifting the "keyboard in effect" to the left by one cluster position.

Continuing with the example being described in which the cluster 46-2 of characters is active, if one wished to enter the letter "K" as the next character, one would have to make the cluster 46-3 of characters active because it contains the desired "K"; this is accomplished by actuating the clear key 16-R (FIG. 5) which "moves the active cluster to the right" or highlights the cluster 46-3 of characters. With cluster 46-3 active, one would then actuate key #2 (FIG. 5) because it corresponds to the position which is occupied by the letter "K" in cluster 46-3. It should be noted that the "keyboard in effect" portion of the display 18 is shown only during that time when this invention is being utilized; this aspect will be reviewed in more detail hereinafter.

Continuing with a discussion of the initialization procedure associated with block 44 (FIG. 3). step 4 of this procedure relates to intializing video attribute bytes and the attribute array as detailed on lines 3800 through 3910 of the program listing. Basically, step 4 relates to the technique employed to highlight the appropriate cluster, like 46-1. In lines 18650 through 18850 of the program listing, the various attribute array elements are included in the strings of data and screen address information. The value of the elements at the time the screen data is displayed determines which parts of the string are to be "light on a dark background" or "dark on a light background". Because some displays may not be capable of producing "reverse video", characters to be highlighted could be "flashed". Lines 27420 and 28000 of the program listing consist of Basic commands to manipulate the CRT attribute array elements associated with the display 18.

Having described those steps included in the initialization represented by block 44 in FIG. 3, the process 40 is continued by depicting the terminal 10 as idle, as at block 45. At this time, a manager, for example, of the store in which the terminal 10 is located, may wish to change some of the promotional messages which appear on the terminal's display 18. In order to prevent a casual user of the terminal 10 from changing the promotional messages in the example described, the person who is authorized to change the messages is given a special card which enables him to gain access to this invention within the terminal 10.

To gain access to this invention, the authorized person or manager, in the example described, passes the special card through the card reader 12 as represented by block 48 (FIG. 3). If the card which is read (block 50) is a typical customer's card, the process 40 proceeds to routine processing (as represented by block 52) in which the usual transaction processing is performed. If the card read is a special card, the manager must enter on the keyboard 14 an identification number (ID) or code as shown by block 54. After the manager has been identified, access to the invention is gained.

The first step in the procedure embodied in this invention after access thereto is gained is to display a manager's menus as represented by block 56 in FIG. 3. If the manager wishes to exit at this point in the process 40 (block 57) he may do so and the process returns to the terminal idle status shown by block 45; however, assume that he wishes to continue. The manager's menu represents a plurality of different functions or options which can be selected by the manager. For example, the Manager's Menu may consist of items like:

(1) "Transaction limit override", (5) "Enter Store Specials", and other items listed at lines 21300 through 21400 of the program listing. In the example being described, the manager may wish to select item (5) which is used for entering store specials; this is represented by block 58 in FIG. 3. The manager then actuates key #5 on the keyboard 14 to make the selection.

After the selection is made, the next step (FIG. 3) in the process 40 is set to parameters for making changes as represented by block 60. The setting of parameters is effected by the steps beginning at line 27000 of the program listing. For example, with regard to line 27100, the following descriptions apply:

1. KC=5 indicates the column in which the message is going to be displayed.
2. KL=32 indicates the length of the line in the display 18.
3. KR=3 indicates the row in which the line will be displayed.
4. KB=0 refers to the first element of the array of data to be edited; this relates to the array of data beginning at line 5050 of the program listing; and
5. KE=3 refers to the last element of the array of data to be edited. These parameters locate the message to be edited, for example, on the display 18, and as previously stated, the lines 5050 through 5550 of the listing indicate the data elements that can be edited in the example being described. Because the editing may involve more than one entry in the list appearing on lines 5050 through 5550, and edit message loop represented by block 61 (FIG. 3) was created.

The edit message loop 62 shown as block 61 in FIG. 3 is shown in more detail in FIG. 6. Basically, the function of the edit message loop 62 is to enable one to progress through the list of selections on the manager's menu (block 56 in FIG. 3).

The first step in the edit message loop 62 (FIG. 6) is to initialize a loop counter (as represented by block 64) to the number of the first element in the list to be edited. In the example described, the first number is 0 as shown on line 5050 of the program listing. The next step is to perform the data editing routine as represented by block 70; this editing routine will be described hereinafter. After the data associated with line 5050 of the program listing is edited using the data editing routine, the number 2 is added to a row counter as represented by block 68 in FIG. 6; two is added to a row counter to get the next line of data to be edited to appear two lines under the prior entry. The loop counter is then incremented by one, as represented by block 71, to get the next line of data (that on line 5100 of the program listing) to appear for editing. The loop counter is examined to determine whether or not the count on it is greater than the last element number in the listing to be edited as shown by block 72. In the embodiment described, the last element number is 3 as shown on line 5200 of the program listing. If the evaluation results in a "No" at block 72, the routine proceeds to the data editing routine shown by block 66. If the evaluation (block 72) results in a "Yes", the routine 62 proceeds to reset the display screen attribute characters to the initial value as represented by block 74. From block 74, the routine 62 returns to the opening menu starting on line 21300 of the program listing or block 56 of FIG. 3.

Figure 7:
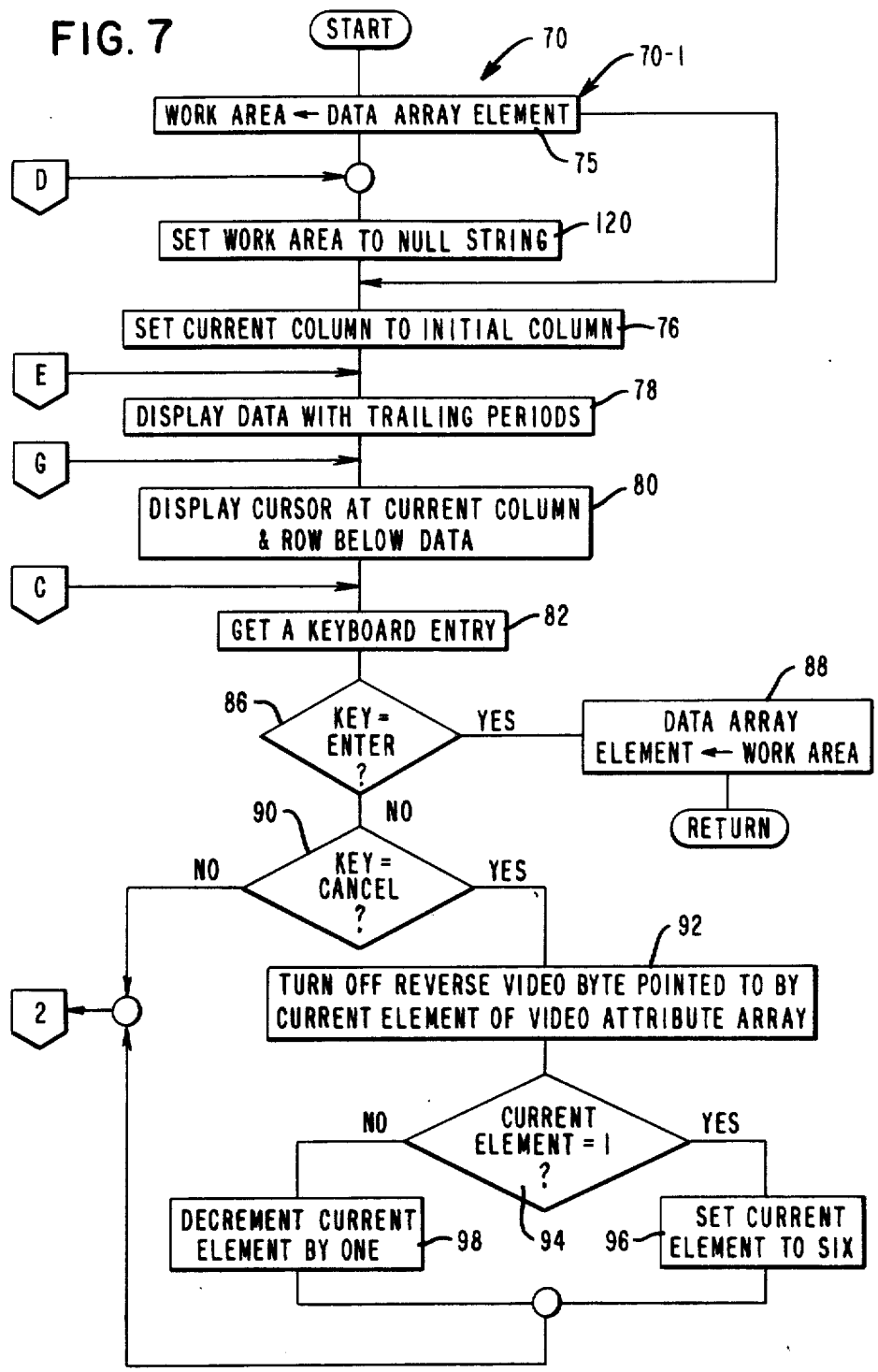
FIG. 7 is a flow chart showing a portion of a data editing routine included in this invention.

The editing routine represented by block 70 in FIG. 6 is shown in FIGS. 7, 8, 9, and 10. A first portion of editing routine 70 is shown in FIG. 7, and this first portion is designated generally as 70-1 Second, third, and fourth portions of the editing routine 70 are shown, respectively, in FIGS. 8, 9, and 10, and they are designated, respectively, as 70-2, 70-3, and 70-4.

Starting with the first portion 70-1 of the editing routine 70 shown in FIG. 7 and continuing with the example being described, it should be recalled that the message, "Enter Promotional Messages Below," appears on the display 18 as indicated by line 27000 of the program listing. Also, the clusters 46 of characters appear on the lower portion of the display 18 as shown in FIG. 4. From block 64 in FIG. 6, it should also be recalled that the loop counter mentioned therewith is initialized or set to a "zero." This means that line 5050 if the detail listing which is, "Today's Specials", will be displayed on the upper part of the display 18; however, before being displayed, it is taken from storage in memory (RAM 24) of the terminal 10 and is placed in a working area or buffer associated with the RAM 24. This last step mentioned is shown as block 75 in FIG. 7. The next step (block 76) relates to setting the current column to the initial column (for the lefthand margin on the display), and the next step (block 78) relates to displaying the data with trailing periods. At this point in the description being given, the following line would be shown on the display 18.

TODAY'S SPECIALS . . .

The trailing period in the above line give an indication of the character spaces yet available as an aid in editing. A cursor is displayed at the current column and at a row below the data to be edited as indicated by block 80 in FIG. 7. In other words, the curser is displayed at the left hand margin, indicating the particular character location on the display 18 where editing can be effected if desired. The first portion 70-1 of the routine then looks for a keyboard entry as indicated by block 82.

At this point, it should be mentioned that if one wanted to perform editing on an entry which is further down on the list of "Todays Specials" (listed on lines 5050-5550 of the program listing), one would simply actuate the enter key 16-E several times. Each time the key 16-E is actuated at this point in the description, the next lower line of data is presented. As an example, actuating the key 16-E twice would bring to the display 18, the line of data, FRESH CORN—$0.25/EAR; this data appears on line 5150 of the program listing.

When a keyboard entry is made (block 82 in FIG. 7), the first portion 70-1 examines it and responds thereto in different ways depending on the particular key which is depressed. In the embodiment described, there are ten numeric keys on the keyboard 14 and three function keys 16-R, 16-L and 16-E as shown in FIG. 5, although this invention may be extended to terminals having a greater or fewing number of function keys. As a general explanation, the clear key 16-R moves the selection of a cluster of characters (FIG. 4) one position or cluster to the right, while the cancel key 16-L moves the selection of a cluster of characters one position or cluster to the left, as viewed in FIG. 4. The enter key 16-E is used to bring up a new line for editing as previously explained. The notations for the keys 16-R, 16-L, and 16E shown in FIG. 5 are included in the bracket 79 on the display 18 (FIG. 4). And finally, the keys 0-9 of the keyboard are used to enter an alphanumeric character depending upon which cluster of the clusters 46 of keys is active.

Figure 10:
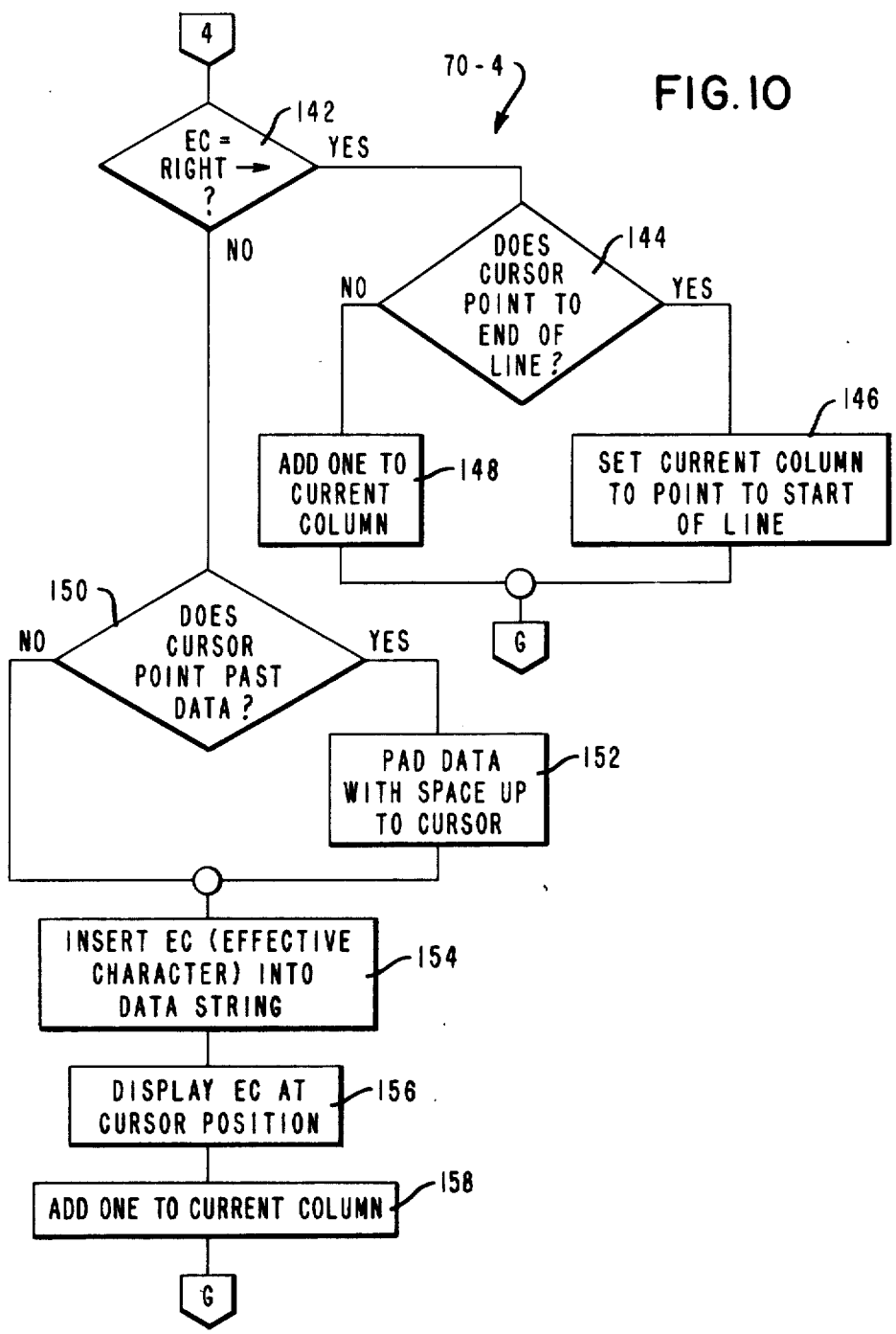
FIG. 10 is a flow chart showing additional steps included in the data editing routine.
Figure 11:
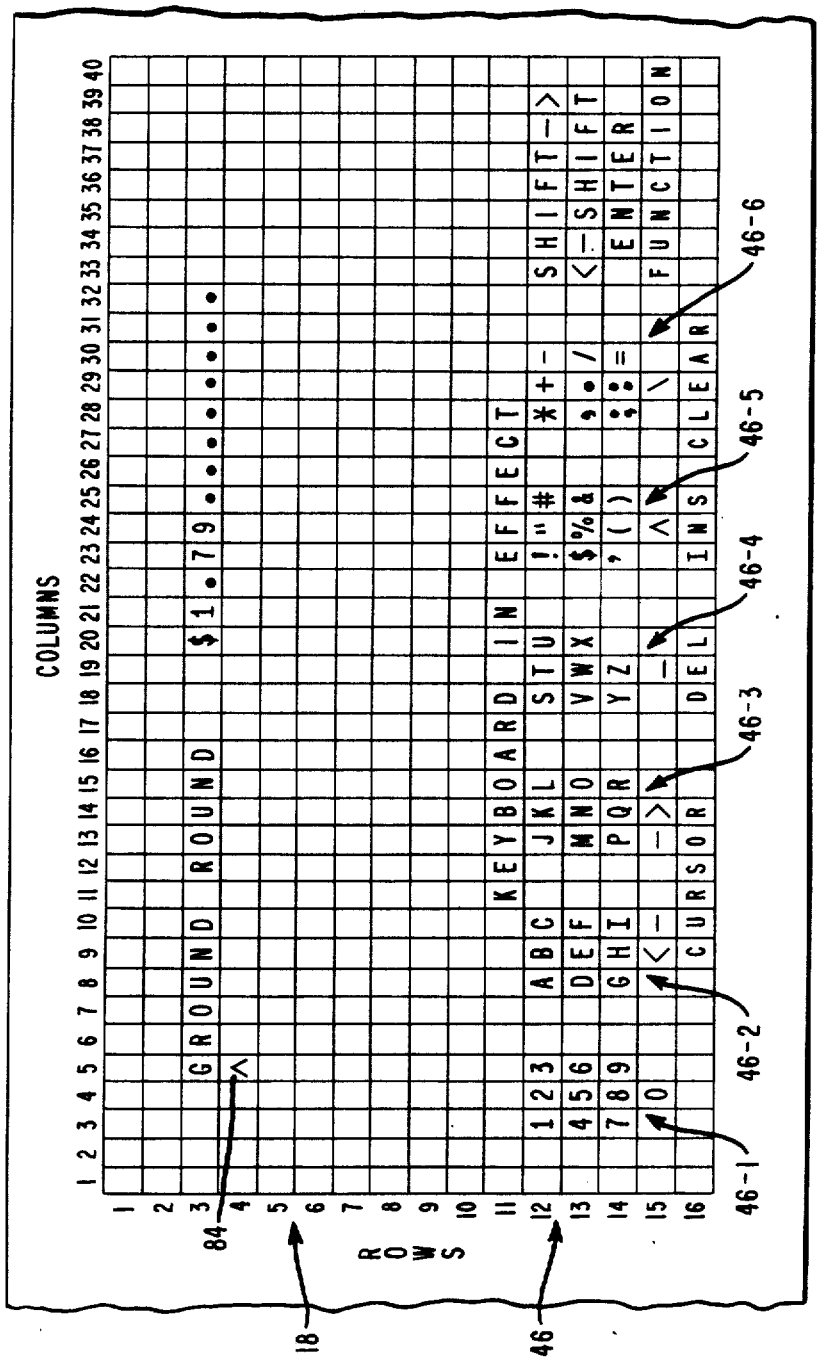
FIG. 11 is a schematic diagram showing certain data on the terminal's display during a certain time during an editing operation.

Having described, generally, how the editing routine 70 (FIGS. 7-10) responds to actuation of the numeric keys and the function keys 16-R, 16-L, and 16-E (FIG. 5), it is useful to describe how one uses these keys in an editing function. In this regard, FIG. 11 shows the display 18 with the message,

"GROUND ROUND—$1.79"

being displayed; this corresponds to the data on line 5100 of the program listing as previously alluded to. Assume that the manager (in the example described) wants to lower the price of the ground round meat to $1.69 per pound. The display 18 is provided with row and column designations to facilitate an explanation of the editing process.

In editing the entry shown in row 3 of the display 18 (FIG. 11) in the example described, the manager wants to change the $1.79 to $1.69. The manager notices that when the message in row 3 first appears on the display 18, the cluster of characters which is active is always the left-most cluster which is cluster 46-1, and the cursor 84 (FIG. 11) is located under the left-most column which is column #5 as previously described. In order to effect the desired change, the manager has to move the cursor 84 several columns to the right until it is located in column 23, under the numeral "7". The cursor 84 indicates that location on the display 18 which is active for data entry as is typically done.

The cursor 84 is moved to the right (as viewed in FIG. 11) by initially making the cluster 46-3 of characters active, and correspondingly, the cursor 84 is moved to the left by initially making the cluster 46-2 of characters active. Continuing with the example being described, to make the cluster 46-3 of characters active with the situation presented in FIG. 11, one has to actuate the clear (Shift) key 16-R two times, thereby making cluster 46-3 active, although it is not portrayed as being active in FIG. 11. Notice that cluster 46-3, in row 15 and column 14, contains the mark (>) which indicates cursor movement to the right and that cluster 46-2, in row 15 and column 9, contains the mark (<) which indicates cursor movement to the left. Row 15 also contains hyphens in columns 10 and 13 which are displayed on display 18 to make the marks (<) and (>) look more like arrows; however, these hypens are not used in controlling the cursor movement.

With the cluster 46-3 (FIG. 11) now active, and with the cursor 84 under the letter "G" of the word "Ground" on the display 18, one can now move the cursor 84 to point to the number 7 in "$1.79" to effect the change to "$1.69" in the example being described by repeatedly actuating the "0" key on the keyboard 14. One actuation of the "0" key moves the cursor 84 one column to the right in the example described.

When the cursor 84 (FIG. 11) is under the number 7 in "$1.79" in the example described, the number 7 can be changed to the number 6 to make "$1.69" by simply overwriting the number 7. This is effected by using cluster 46-1 as the active cluster The cluster 46-1 is made active by actuating the cancel (shift) key 16-L (FIG. 5) two times. Thereafter, the number 6 on the keyboard 14 is actuated to thereby overwrite "6" in the space occupied by "7" to complete the editing to produce "$1.69" in the example described. Thereafter, the enter key 16-E (FIG. 5) is actuated (block 86 in FIG. 7), and the revised or edited data is transferred from the buffer memory section of RAM 24 to its stored location therein as represented by block 88.

Some additional points need clarification with regard to the editing technique just described. Notice that row 15 of the display 18 (FIG. 11) includes a delete mark (—) in column 19 of cluster 46-4; it includes an insert mark (∧) in column 24 of cluster 46-5; and it also includes a clear mark (\) in column 29 of cluster 46-6. These marks in row 15 of each of the clusters 46 represent functions to be performed except for the "0" in cluster 46-1. The (←) and (→) marks in clusters 46-2 and 46-3 move the cursor 84 previously explained; the delete mark (—) deletes the character positioned at the cursor 84; the insert mark (∧) inserts a blank space at the position of the cursor; and the clear mark (\) erases the entire line positioned above the cursor 84. From what has been described, editing of the data on the display 18 can be accomplished by using the functions represented by the symbols in row 15 of the clusters 46-2 through 46-6 when the associated cluster is active and the key "0" on the keyboard 14 is actuated. Notice that any of the numbers or characters included in the clusters 46-1 through 46-6 can be accessed by this technique. If one wants to enter the letter "K," for example, cluster 46-3 is made the active cluster by the technique described, and thereafter numeral "2" on the keyboard 14 is actuated. Correspondingly, if one wants to enter the "%" sign, cluster 46-5 is made the active cluster, and thereafter, numeral "5" on the keyboard 14 is actuated. The periods extending to the right of the price "$1.79" shown on FIG. 11 indicate the length of the space available for entry.

Figure 8:
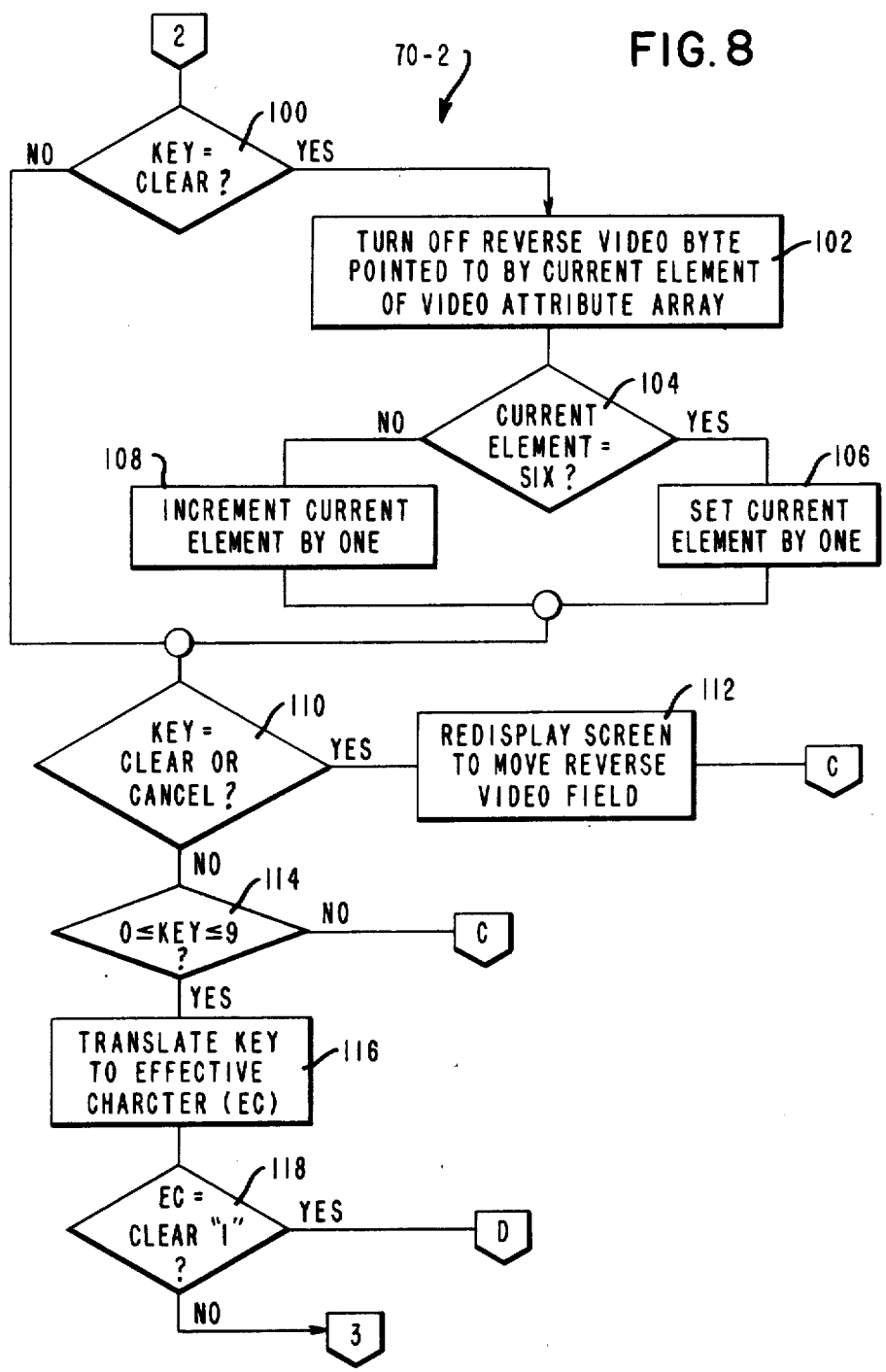
FIG. 8 is a flow chart showing additional steps included in the data editing routine.
Figure 9:
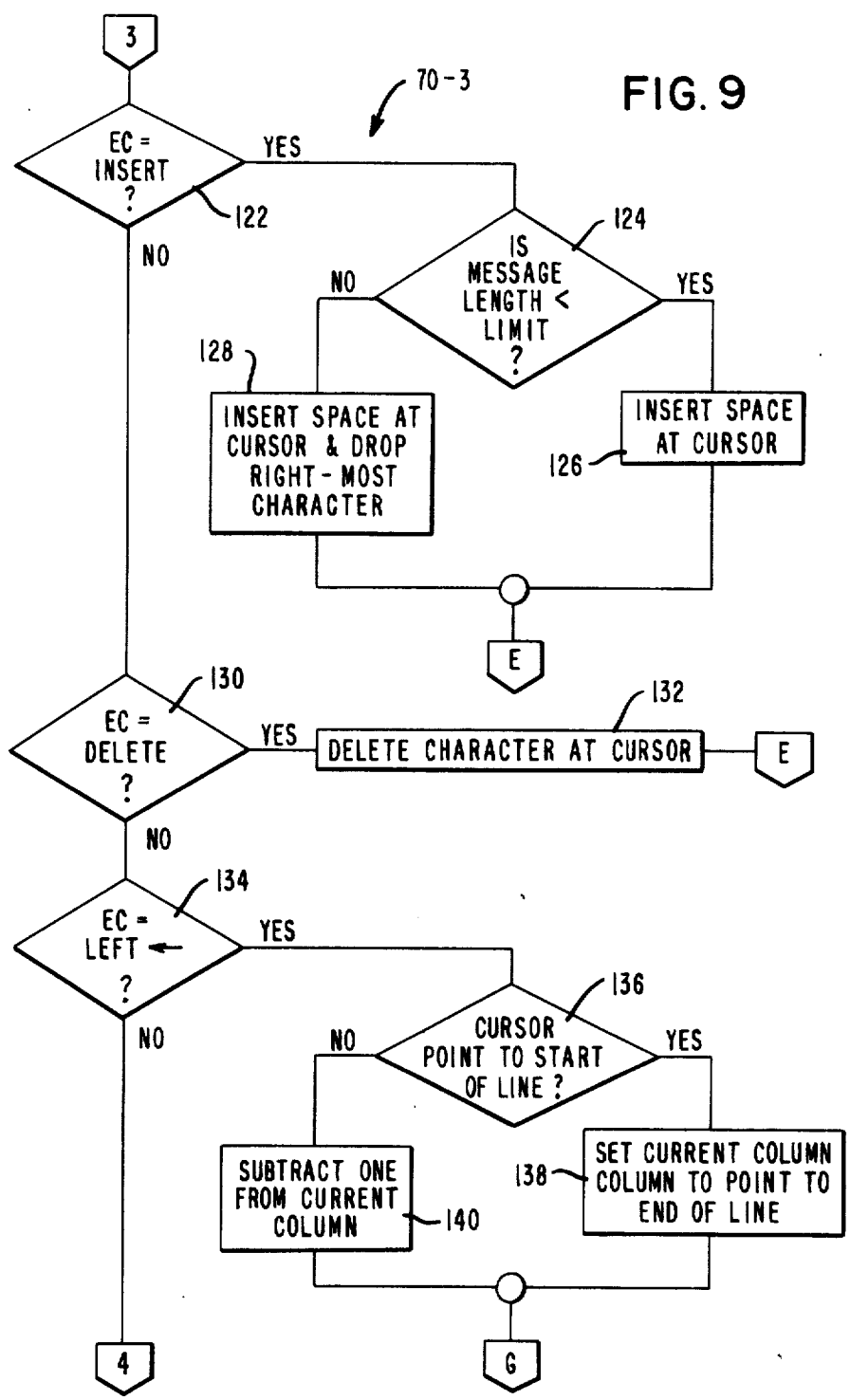
FIG. 9 is a flow chart showing additional steps included in the data editing routine.

Having discussed the general process by which the editing routine 70 is effected, it seems appropriate to continue with the description associated with the first portion 70-1 of the editing routine 70 starting in FIG. 7. It should be recalled that the detailed description of the first portion 70-1 was momentarily postponed at blocks 82 and 86 in FIG. 7 in order to provide a general description of the editing routine 70. FIGS. 8, 9, and 10 contain additional steps of the editing routine 70, showing how it responds to the actuation of the various numeral keys on the keyboard 14 and the function keys 16-R, 16-L, and 16-E shown in FIG. 5.

Continuing with the first portion 70-1 of the editing routine 70 (FIG. 7), if the key which is actuated at block 82 is not an enter key 16-E, the first portion 70-1 proceeds to determine whether or not the actuated key is a cancel (shift) key 16-L as represented by block 90. If a cancel key (block 90) has been actuated, it means that the user wishes to "move the active cluster to the left". The next step (block 92) is to turn off the reverse video byte pointed to by the current element of the video attribute array (shown on line 3800 of the program listing) because a new cluster is to be "highlighted" subsequently. Earlier herein it was stated that at the beginning of the editing routine 70, the cluster 46-1 of characters is highlighted (by reverse video) as shown by the dark background around this cluster as shown in FIG. 11. Assuming that cluster 46-1 is the cluster or element which is currently active, a "yes" output would occur from the logic activity represented by block 94. The routine 70 is provided with a "wrap-around" technique in that if cluster 46-1 is active and the user wants cluster 46-6 (FIG. 11) to become active, actuates the cancel (shift) key 16-L to "move the active cluster to the left using the wrap-around" to arrive at cluster 46-6 (FIG. 11) being active; this is effected by setting the current element (cluster) to 6 as represented by block 96. If the cluster of characters which is currently active is not equal to 1 (i.e. cluster 46-1), then the current element is decremented by 1 as represented by block 98 in FIG. 7.

In effect, this action shifts sequentially the active cluster one cluster position to the left. From the steps represented by blocks 96 and 98, the first portion 70-1 of editing routine 70 proceeds to point 2 shown at the top of FIG. 8.

The steps represented by blocks 100, 102, 104, 106 and 108 in FIG. 8 correspond to the steps represented by blocks 90, 92, 94, 96, and 98 in FIG. 7, except that the steps in FIG. 8 are used to select the cluster which is to be active by "moving the active cluster one position to the right" in response to the actuation of the clear (shift) key 16-R (FIG. 5). Notice that if the cluster 46-6 is active (current element=6) and one wishes to make cluster 46-1 active, the current element is set to one as shown by block 106 in FIG. 8. This provides wrap-around in the right direction as viewed in FIG. 11.

Notice that if the clear (shift) key 16-R is not actuated (block 100), the second portion 70-2 of the routine 70 progresses to the state represented by block 110 in FIG. 8; the portion 70-2 also progresses to this state from what has been described relative to blocks 106 and 108. If the clear (shift) key 16-R or the cancel (shift) key 16-L have been actuated, it means that the active cluster of characters has been changed, and the newly-selected cluster is now highlighted by "reverse video" as represented by block 112. From the state represented by block 112, the second portion 70-2 progresses to point "C" in FIG. 7.

Notice, that in determining what key was actuated in a keyboard entry from block 82 in FIG. 7, through block 90 in FIG. 7, through block 100 in FIG. 8, and through block 110 in FIG. 8, if a function key is not actuated, then what's left is one of the keys 0-9 from the keyboard 14 as represented by block 114 in FIG. 8. If one of the numeric keys 0-9 is not actuated, the second portion 70-2 progresses to point "C" in FIG. 7; actuation of any other key at this point (block 114) is ignored. If, however, one of the numeric keys 0-9 from keyboard 14 is actuated, that particular key actuated is translated (lines 28200-28250) into an effective character as represented by block 116 in FIG. 8. Line 1850 of the program listing shows the string of characters which are representative of the clusters 46 of characters. This string of characters corresponds to the clusters 46 of characters shown in FIG. 4, for example. Notice that the first ten characters (0-9) in the string correspond to the first cluster 46-1 of characters, the second ten characters (<AB ... I) in the string correspond to the second cluster 46-2 of characters, etc. As another example, if the second cluster 46-2 of characters is active, and the numeral key 5 on keyboard 14 is actuated, the character "E" becomes the effective character or the character to be entered. Notice that at this stage (block 116) in the routine 70-2, the effective character could be one of the characters which initiates a function as shown by the characters shown in row 15 and included in the clusters of characters 46-2 through 46-6 (FIG. 4); consequently, a check is made of these characters.

The first part of the check mentioned (block 118 in FIG. 8), is to determine whether or not the effective character is a clear function represented by the (\) character in row 15 (FIG. 4) of cluster 46-6. If it is, the second portion 70-2 of the routine 70 proceeds to point "D" in FIG. 7. It should be recalled that the clear (\) character means that the entire line should be deleted; this is effected by setting the work area (buffer memory) to a null string as represented by block 120 in FIG. 7. If the effective character is not a clear character (\), the second portion 70-2 proceeds to point 3 in FIG. 9 showing the third portion 70-3 of the editing routine 70.

Continuing with an examination of the effective characters, the third portion 70-3 of routine 70 (FIG. 9) determines (block 122) whether or not the effective character (EC) is an insert ( ʌ ) character. If an insert ( ʌ ) character is determined (block 122), the third portion 70-3 proceeds to determine whether or not the message length is less than the limit as indicated at block 124. It should be recalled that the message length in the example described is 32 columns, as shown in row 3 of the display 18 (FIG. 11). If the message length is less than the limit, a space is inserted in the message where the cursor 84 is located, as represented by block 126 (FIG. 9). If the message length is greater than the limit, a space is inserted at the position of the cursor 84 (as represented by block 128), and the right-most character of the message is deleted; as an example, for row 3 in FIG. 11, the period shown in column 32 would be deleted because the entire message in row 3 would be shifted to the right one column to enable a space to be entered in column 5 which was occupied by the letter "G". From the steps represented by blocks 126 and 128, the third routine 70-3 of the routine 70 proceeds to point "E" in FIG. 7.

Continuing with an examination of the effective characters, the third portion 70-3 of the routine 70 (FIG. 9) determines (block 130) whether or not the effective character is a delete (—) symbol or character. If it is, the character which is located at the cursor 84 (FIG. 11) is deleted as represented by block 132, and thereafter, the third portion 70-3 proceeds to point "E" in FIG. 7.

Continuing with an examination of the effective characters, if the effective character is not a delete character (block 130), the third portion 70-3 of the routine 70 proceeds to determine whether or not it is a cursor shift (<) character (shift to left) as represented by block 134 in FIG. 9. If the effective character is a cursor shift (<) character, another evaluation (block 136) is made to determine wheter or not the cursor 84 points to the start of a line on the display 18. If it does, the current column for the cursor 84 (FIG. 11) is set (block 138) to point to the end of the line (column 32 in the example described); this is analogous to the "wrap-around" technique mentioned earlier herein. If the cursor 84 does not point to the start of the line (block 136), one is subtracted from the current position (block 140) of the cursor 84 to shift it one column position to the left. From the steps represented by blocks 138 and 140 in FIG. 9, the third portion 70-3 of the routine 70 proceeds to point "G" in FIG. 7. If the determination (block 134) indicates that the effective key is not a cursor shift (<) character, the third portion 70-3 proceeds to point 4 in FIG. 10.

Continuing with the examination of the effective characters, if the effective character is not a cursor (<) shift character, the fourth portion 70-4 of the routine 70 (FIG. 10) proceeds to determine whether or not it is a cursor shift (>) character (shift to right) as represented by block 142. If the effective character is a cursor shift (>) character, another evaluation (block 144) is made to determine whether or not the cursor points to the end (right side) of the line on the display 18. If it does, the current column for the cursor 84 (FIG. 11) is set (block 146) to point to the start of the line; this is analogous to the "wrap-around" technique already mentioned. If the cursor 84 does not point to the end of the line, "one" is added to the current column position of the cursor 84

(block 148) to shift it one position or column to the right. From the steps represented by blocks 146 and 148, the fourth portion 70-4 proceeds to point "G" in FIG. 7.

Continuing with the fourth portion 70-4 of the editing routine 70, (FIG. 10), if the effective character is not a cursor shift (>) character (block 142), then it must be a non-function character like 0-9, A-Z, etc. However, before inserting the effective character into the data string, an evaluation (block 150) is made to determine whether or not the cursor 84 points past the data. If it does, then the data string is padded on the right with space up to the cursor 84 as represented by block 152. The padding is necessary to prevent the insertion of a character (line 28600) into the data string when the cursor 84 points beyond the end of a data string. A BASIC programming error would be generated if such a condition were allowed to exist.

If the cursor does not point past the data (block 150 in FIG. 10), the fourth portion 70-4 of the editing routine 70 proceeds to the step represented by block 154 in which the effective character is inserted into the data string. In the example being described, it means that the effective character (depending on a particular cluster of keys and numeric key) is inserted into the data string shown in row 3 of FIG. 11 and line 5100 of the program listing. The particular effective character is then displayed (block 156) at the cursor position, and "one" is added (block 158) to the current column to cause the cursor 84 to shift one column position to the right as viewed in FIG. 11. Thereafter, the cursor is displayed on the display 18 as represented by block 80 in FIG. 7.

To summarize, a line of data like that shown in row 3 of FIG. 11, has just been edited, and the editing routine returns from point G in FIG. 10 to point G in FIG. 7. The editing routine 70 now waits for a keyboard entry again (block 82). Actuating the enter key 16-E at this time will bring the next line for editing on the display 18. In the example being described, the next line corresponds to line 5150 of the program listing. The remaining steps in the editing routine 70 can be repeated as needed.

While this invention is explained easiest in terms of a into the effective character was already discussed with regard to step 116 (for example) of FIG. 8.
method or process, it may also be viewed as a data entry terminal for entering characters from a predetermined number of characters. In the embodiment described, there are sixty characters displayed in the clusters 46-1 through 46-6, and these sixty characters are selected using the display 18, numeric keys 0-9, and three function keys 16-R, 16-L, and 16-E. Naturally, other amounts of characters and keys could be used depending upon particular applications.

When the invention is viewed as a data entry terminal, the terminal 10 (FIG. 2) includes also a means 160 for presenting characters on the display 18, a first coupling means 162 which couples the function keys 16-R, 16-L, and 16-E to the presenting means 160, and a second coupling means 164 for coupling the character entry keys 0-9 of keyboard 14 with the presenting means 160. The presenting means 160, the first coupling means 162, and the second coupling means 164 are shown as separate entries in FIG. 2; however, these means are embodied in the RAM 24 or ROM 22, for example, depending upon how the invention was packaged or included in the terminal 10.

The presenting means 160 is embodied in the display 18 and lines 18650-18850 of the program listing, with the actual display of clusters 46 of characters being shown in FIG. 4, for example.

The first coupling means 162 couples the function keys 16-R and 16-L to the presenting means 160 to enable the selecting of that one of the clusters 46 of characters which contains the character to be entered on the terminal 10. This is portrayed, for example, in the steps associated with blocks 90-96 (FIG. 7) and blocks 100-112 (FIG. 8).

The second coupling means 164 couples the character entry keys 0-9 of keyboard 14 with the presenting means 160 to enable the selecting of a character to be intered from the cluster of characters, like 46-4 which cluster was selected by the function keys 16-R and 16-L. The character to be selected from the selected cluster of characters is selected by actuating that one of the entry keys 0-9 of keyboard 14 whose position on the array of the keyboard 14 corresponds to the character to be selected from the array of the cluster of characters on the display 18 as previously explained. Translating a particular key (on the keyboard 14) which is actuated into the effective character was already discussed with regard to step 116 (for example) of FIG. 8.

```
               1         1         2         2         3         3         4         4         5         5         6         6         7         7         8         8         9         9
      ..5....0....5....0....5....0....5....0....5....0....5....0....5....0....5....0....5....0....5....0....5....0....5....0....5....0....5....0....5....0....5....0....5....0....5....0....5....0....5..
IVULIS 50623040082001999000010000

NCR BASIC-C2262000I.00010
 50 '"(C) COPYRIGHT NCR CORPORATION 1983,1984
100 '"            ALL RIGHTS RESERVED
150 '"05062304 - ATM MARKETING SUPPORT
200 '"AUTHOR - M.N.DAVIS,II
250 '"84/09/21 - C5062 ETS-B 3.0  8406220834
310 '
320 'LAST CHANGE -
330 '  84/08/23 - ADD DOUBLE WIDE CHARACTERS TO WELCOME SCREENS AND ADD CODE FOR EDITING DOUBLE WID
E CHARACTERS ON EITHER PRINTER OR CRT
340 '
350 CLOSE:CLEAR 10000;24000'------SYS INIT
400 ID$="05062304 - COPYRIGHT NCR CORP 1983,1984"
450 ON ERROR GOTO 950
500 GOTO 1550
550 TJ#=TS#+250:FOR TC=1 TO TU#:NEXT TC:RETURN'ERROR DISPLAY TIMER
600 TJ#=TS#+75:TC=1:FC=0'MSR TIMER
650 IF CMPLT(#7) THEN FC=1:RETURN
700 IF TC<TU# THEN TC=TC+1:GOTO 650
750 RETURN
800 TJ#=TS#+75:TC=1:FC=0:FT=0'KYBD TIMER
850 IF CMPLT(#2) THEN IF STATUS=2313 THEN FP=1 ELSE IF STATUS THEN FS=1 ELSE FC=1 ELSE IF TC<TU# THE
N TC=TC+1:GOTO 850 ELSE FT=1
900 RETURN
```

```
950 "..."IF FT THEN GOSUB 15900:TS=5:GOTO 1250
1000 IF FE THEN GOSUB 15950:TS=5:GOSUB 550:GOTO 1250
1050 IF FA=1 THEN GOSUB 15800:TS=5:GOSUB 550 ELSE IF FP THEN 1250 ELSE GOSUB 1300
1100 IF ERR=101 THEN GOSUB 1300
1150 IF ERR=102 THEN GOSUB 1300:FC=0:GOSUB 20550
1200 IF FF=1 THEN FF=0:LOCATE 16,1:PRINT "TO CONTINUE PUSH ENTER";Z$=INPUT$(1):IF ASC>>0 THEN 1200
1250 RESUME 7250
1300 LOCATE 14,1:PRINT "ERROR ";ERR;"AT LINE ";ERL;"STAT=";STATUS
1350 DISPLAY A9,20,FNCE:WAIT #4
1400 LOCATE 15,1:PRINT "FLAGS ABCEUPST=";FA;F3;FC;FE;FU;FP;FS;FT
1450 FF=1
1500 RETURN
1550 DEFINT F,I-L,R
1600 DEFSTR A-D,M,O,S-Z
1650 SN="":S1="1":S2="12":S3="123":S4="1234":S5="12345":S6="123456":S7="1234567":S8="12345678":S9="123456789":S0="1234567890"
1700 OPEN "13:" AS #2 RECSIZE 66"KEYBOARD
1750 OPEN "13:" AS #3 RECSIZE 0"KB ABORT
1800 KB$=CHR$(0)+CHR$(63)+"1*****"+"20*****"+"3*****"+"\0*****"+"47*****"+"7HV*****"+");********"
+"A"+CHR$(139)+"******
1850 K$="0123456789<ABCDEFGHI>JKLMNOPQR_STUVWXYZ  ^[=]%&'()\*+-,./;:"""
1900 ACCEPT #2,"E205",KB$:WAIT #2"USER DEFINED KYBD
1950 CLOSE #2:OPEN "13:" AS #2 RECSIZE 1
2000 "ACCEPT #2,"E204",Z$:WAIT #2"DISABLE KEY CLICK
2050 AL="<":AK=">":IN$="^"
2100 CA="^"CANCEL KEY
2150 CL="\"CLEAR KEY
```

```
2200 DE="_":SL="A":SR="\"'DELETE, SHFT LFT, SHFT RIGHT CHARACTERS
2250 EN$=CHR$(139)'NEWLINE KEY
2300 LB$="IVULTRMTUTRM018L29349900010000"
2350 EL=3:EM=3:EN=5'AMT ENTRY LIMITS
2400 PL=3:PM=4:PN=6:PN$="9999"'PIN ENTRY LIMITS
2450 OPEN "1:" AS #1'JRNL
2500 OPEN "7:" AS #7 RECSIZE 40'MSR
2550 OPEN "0:" AS #4 RECSIZE 640'CRT
2600 D2=CHR$(18):D3=CHR$(19):D4=CHR$(20)
2650 ZA="E302"'ABURT
2700 ZC="E2848080d0800"'OPEN JAMS AFTER PRINT
2750 ZT="E2848080803O"'OPEN AT MSR ENABLE
2800 ZD="E201"'DSPLY ON CRT
2850 ZK="E101"'KYBD
2900 ZM="E101"'MSR
2950 ZO="E2A480d018030"'OPEN JAMS & ENFORCE SLIP
3000 ZP="E28081808180O"'PRT LINE
3050 DEF FNCD=CHR$(27)+"U"
3100 DEF FNCE=CHR$(27)+"V"
3150 DEF FNCA(RZ,CZ)=CHR$(27)+"Y"+CHR$(RZ+31)+CHR$(CZ+31)"'SET CURSOR ADDRESS
3200 DEF FNCS=CHR$(12)+CHR$(27)+"U "+CHR$(27)+"U"
3250 DEF FNMA(I)=SPACE$(20-LEN(AT(I)))-LEN(MA))
3300 DEF FNMB(I)=SPACE$(20-LEN(AT(I)))-LEN(MB))
3350 DEF FNMD(I)=AT(I)+" "+AN(I)+SPACE$(38-LEN(AT(I))-LEN(AN(I))-LEN(MA))+MA
3400 DEF FNMF(I)=SPACE$(38-LEN(AN(I))-LEN(MA))
3450 DEF FNMP(I)=FNCA(I*2+6,(41-LEN(MP(I))) DIV 2)+MP(I)
```

```
3500 DEF FNM0(I)=FNCA(I*2-3,4)+MP(I)
3550 DEF FNE$(I$)=ENCODE$(M$,I#)
3600 DEF FNF$(I#)=ENCODE$(MK,I#)
3650 DEF FNG$(I$)=RIGHT$(I$,LEN(I$)-INSTR(I$," "))
3660 B$=STRING$(3,7) 'BELL CHARACTER
3700 BL=CHR$(15)+CHR$(8) 'FLASH
3750 B$=CHR$(15)+CHR$(0) 'OPTION OFF
3760 BF=CHR$(15):B2=CHR$(2):B0=CHR$(0):B0=BF+02:BF=BF+80'CRT CONTROL CHARACTERS
3800 DIM BR(7)'KYBD VIDEO CONTROL CHAR
3850 BR(0)=CHR$(15)+CHR$(1)'RVS VID
3900 FOR I=1 TO 7:BR(I)=B$:NEXT I
3910 FG=1:BR(FG)=BR(0)
3950 LT=250'PRT T/0 VALUE
4000 TR=2000'TRAN#
4050 MC="16:27"'TIME
4100 MD="03/06/84"
4250 ND$="0/21"'HOST AUDIT#
4300 NC$="27789876"'AUTH#
4450 MS="$$##.##"'A$I PRT
4500 MR="$$##.##"'AMT PRT
4550 ME="*##.##"'AMT ENTRY
4600 ML#=900'TRMNL LIM
4650 HL#=750'HOST LIM
4700 DIM BA#(5)'ACCT BAL TBL
4750 BA#(1)=1495'CHK
4800 BA#(2)=1000'SAV
```

```
4850 BA#(3)=1500'NOW
4900 BA#(4)=3000'VISA
4950 BA#(5)=2000'MC
5000 DIM MP(11)'PROMO MSG TBL
5050 MP(0)="** TODAY'S SPECIALS **"
5100 MP(1)="GROUND ROUND - $1.79"
5150 MP(2)="FRESH CORN - $.25/EAR"
5200 MP(3)="LEMONS - 3 FOR $.25"
5250 MP(4)=B0+"ATM SYSTEMS"+BT+"BY"+B0+"NCR"+BT
5300 MP(5)=" FULLY PROGRAMMABLE IN ETS-BASIC"
5350 MP(6)="  "+B0+"USER FRIENDLY"
5400 MP(7)="        TALKS MOST PROTOCOLS"
5450 MP(8)="PAY TO THE ORDER OF"
5500 MP(9)="STORE NAME AND TERM NUMBER"
5550 MP(10)=D2+"NCR"+D3+" HAS GOOD CONNECTIONS "
5600 DIM AN(5)'ACCT# TABLE
5650 AN(1)="1122334455"
5700 AN(2)="6677889911"
5750 AN(3)="5987654321"
5800 AN(4)="4444555533331111"
5850 AN(5)="5412349876543210"
5900 DIM TT$(3)'TRAN TYPES
5950 TT$(1)="WITHDRAWL FROM "
6000 TT$(2)=" APPROVAL"
6050 TT$(3)=" ACCOUNT BALANCE"
6100 DIM GT(5)'APPROVAL TYPES
```

```
6150 CT(1)="CHECK FOR CASH"
6200 CT(2)="PURCHASE AMOUNT"
6250 CT(3)="PURCHASE + CASH"
6300 CT(4)="PAYROLL CHECK"
6350 CT(5)="GOVERNMENT CHECK"
6400 DIM D(3) 'CRT DSPLY LINES
6450 D(0)=SN:D(1)=SN:D(2)=SN:D(3)=SN
6500 DIM M(5) 'PRT ARRAY
6550 M(0)=SN:M(1)=SN:M(2)=SN:M(3)=SN:M(4)=SN:M(5)=SN
6600 DIM TA#(5) 'HOL AMT ARRAY
6650 TA#(1)=25.00
6700 TA#(2)=50.00
6750 TA#(3)=75.00
6800 TA#(4)=100.00
6850 DIM AT(5) 'ACCT TYPES
6900 AT(1)="CHECKING"
6950 AT(2)="SAVINGS"
7000 AT(3)="NOW"
7050 AT(4)="VISA"
7100 AT(5)="MASTERCARD"
7150 FD=0
7200 '----- HOME
7250 BE=SN:FA=0:FB=0:FE=0:FU=0:FP=0:FS=0:FT=0:RE=0:F=0:CU=SN:TT%(0)=SN:AT(0)=SN:TA#(0)=0:TR%=SN:HAM=0 'INIT FLGS
7300 DISPLAY #1,ZT,SN:WAIT #1
7350 ACCEPT #7,ZM,CU'RD CD
```

```
7400 IF FU,THEN GOSUB 18500 ELSE IF RE THEN RE=RE+1:GOSUB 16300 ELSE IF F=0 THEN F=1:GOSUB 13950:F=0
E GOSUB 13950:F=0
7450 IF RE>4 THEN RF=0:WAIT #7:GOTO 7250
7500 TS=5:GOSUB 600
7550 IF FC=0 THEN 7400
7600 IF STATUS=2313 THEN 7350
7650 IF RE>3 THEN GOSUB 13850:TS=5:GOSUB 550:GOTO 7250
7700 IF STATUS>0 THEN GOSUB 13850:TS=RE+1:GOTO 7350
7750 IF LEN(CD)=4 AND CD="9999" THEN GOSUB 21250:GOTO 7250
7760 IF LEN(CD)>0 THEN GOSUB 13850:TS=5:GOSUB 550:GOTO 7250
7082 IF FU THEN 7350
7850 RE=0
7900 GOSUB 14050'TRAN SEL SCR
7950 J=SN:GOSUB 20750
8000 IF FU THEN ERROR 201
8050 J=INSTR(S4,0)
8100 IF J=0 THEN RE=RE+1:GOTO 7950 ELSE RE=0
8150 TT$(0)=0'SV TKN TYP
8200 ON J GOTO 8300,12700,10900,26500'MDL,CHK APPRVL,ABI,COUPON PRINT
8250 '------ MDL RTN
8300 GOSUB 14250'MDL ACCTS SCR
8350 J=SN:GOSUB 20750:IF FU THEN ERROR 202
8400 J=INSTR(S5,0)
8450 IF J=0 THEN RE=RE+1:GOTO 8350 ELSE RE=0
8500 AT(0)=0'SV ACCT TYP
8550 GOSUB 14350'MDL AMT SCR
```

```
8600 J=SN:GOSUB 20750
8650 IF FU THEN ERROR 203
8700 J=INSTR(S$,U)
8750 IF J=0 THEN RE=RE+1:GOTO 8600 ELSE RE=0
8800 IF J=5 THEN 9000
8850 TA#(0)=J
8900 HA#=TA#(J)'SET HDL AMT
8950 GOTO 9200
9000 GOSUB 14550'ENTER AMT SCR
9050 GOSUB 19750'GET AMT ENTRY
9100 IF FU THEN ERROR 204
9150 IF HA#>HL# THEN HA#=HL#:GOSUB 14750:GOTO 7250
9200 GOSUB 16050'GET PIN ENTRY
9250 IF FU THEN ERROR 205
9300 TR=TR+1
9350 TR$=RIGHT$(STR$(TR),4)
9400 GOSUB 15600:TS=5:GOSUB 550'SIMULATE RESPONSE FROM HOST
9450 IF HA#>HL# THEN HA#=HL#:GOSUB 14750:GOTO 7250
9500 BA#(VAL(AT(0)))=BA#(VAL(AT(0)))-HA#
9550 FR=0:GOSUB 17100'INSERT FORM
9600 MT=TT$(L)+AT(VAL(AT(0)))
9650 MA=FN$(FNF$(HA#)))
9700 GOSUB 9900
9750 IF FT THEN GOSUB 15850:TS=5:GOSUB 550
9800 GOTO 7250
9850 '-----END HDL RTN
```

```
9900  T(0)=MP(8)+SPACE$(32-LEN(MP(8)))+MD
9950  T(1)=MP(9)+SPACE$(29-LEN(MP(9)))+" TIME "+MC
10000 M(2)="CARD# "+CO+SPACE$(24-LEN(CO))+"TRAN# "+TR$
10050 M(3)=MT+SPACE$(26-LEN(MT))+"AUTH# "+NZ$
10100 M(4)=ND$+SPACE$(29-LEN(MA)+2)+"AMOUNT"+CHK$(18)+MA
10150 M(5)=SPACE$(40-LEN(MP(10))) DIV 2)+MP(10)
10200 GOSUB 10300:RETURN
10250 '-----RCPT PRT RTN
10300 DISPLAY #1,20,SN:WAIT #1"OPEN JAWS
10350 IF STATUS=2317 THEN IF BE=SN THEN RE=RE+1:IF RE>LT THEN RE=0:BE=BL:GOSUB 10750:GOTO 10300 ELSE
      GOTO 10300 ELSE IF RE>LT THEN RE=0:BE=SN:FT=1:GOTO 10700 ELSE RE=RE+1:GOTO 10300 ELSE IF STATUS THE
N ERROR 207
10390 DISPLAY #1,ZP,M(0)+U4
10400 GOSUB 15600
10410 WAIT #1
10450 FOR I=1 TO 5
10500 DISPLAY #1,ZP,M(I)+U4:WAIT #1
10550 NEXT I
10600 DISPLAY #1,ZC,U4:WAIT #1
10650 GOSUB 17150:TS=5:GOSUB 550
10700 RETURN
10750 IF FR=1 THEN GOSUB 18300 ELSE GOSUB 17121
10800 RETURN
10850 '-----ABT RTN
10900 GOSUB 16550"ABT ACCT SEL
10950 Q=SN:GOSUB 20750:IF FU THEN ERROR 206
```

```
11000 J=INSTR(S6,0)
11050 IF J=0 THEN KE=RE+1:GOTO 10950 ELSE RE=0
11100 JA=J:AT(0)=J'ABI TYPE
11150 TR=TR+1
11200 TR6=STR$(TR)
11250 GOSUB 16050'GET PIN
11300 IF FU THEN ERROR 220
11350 GOSUB 15600:TS=5:GOSUB 550'SIM HO RESP
11400 IF JA=6 THEN GOSUB 17200 ELSE GOSUB 16650
11450 GOTO 7250'-----END AB1 RTN
11500 FR=0:GOSUB 17100'INSERT FORM SCR
11550 M(0)="DATE "+MD+" TIME "+MC+" TRAN # "+TR$
11600 M(1)=MP(9)
11650 M(2)="CARD# "+CJ+SPACE$(24-LEN(CD))
11700 M(3)="ACCOUNT BALANCE(S): "
11750 IF JA=6 THEN 12050
11800 E#=BA#(JA)
11850 MA=FNE$(E#)
11900 M(3)=M(3)+AT(JA)+FNMA(JA)+MA
11950 M(4)=SN:M(5)=MP(10)
12000 GOTO 12500
12050 E#=BA#(1)
12100 MA=FNE$(E#)
12150 M(3)=M(3)+AT(1)+FNMA(1)+MA
12200 E#=BA#(2):EL#=BA#(3)
12250 MA=FNE$(E#):MB=FNE$(EL#)
```

```
12300 M(4)=AT(2)+FNMA(2)+MA+AT(3)+FNMB(3)+MB
12350 EM=BAM(4):ELM=BAM(5)
12400 MA=FNE$(ELM):MB=FNE$(EM)
12450 M(5)=AT(4)+FNMA(4)+MA+AT(5)+FNMB(5)+MB
12500 GOSUB 10300'PRINT BALANCES
12550 IF FT THEN GOSUB 15850:TS=5:GOSUB 550
12600 RETURN
12650 '----- CHK APRVL RTN
12700 GOSUB 17750' APPROVAL TYPE SCR
12750 Q=SN:GOSUB 20750'GET APPROVAL TYPE
12800 IF FU THEN ERROR 209
12850 J=INSTR(S5,J)
12900 IF J=0 THEN RE=RE+1:GOTO 12750 ELSE RE=0
12950 CT(0)=0
13000 IF J=2 THEN 13250
13050 GOSUB 17850'ENTER AMT SCR
13100 GOSUB 19750'GET AMT ENTRY
13150 IF FU THEN ERROR 210
13200 IF HA#>HL# THEN HA#=HL#:GOSUB 17950:GOTO 7250
13250 GOSUB 16050'GET PIN ENTRY
13300 IF FU THEN ERROR 211
13350 TR=TR+1
13400 GOSUB 15650:TS=5:GOSUB 550'SIMULATE RESPONSE FROM HOST
13450 FR=1:GOSUB 18300'INSERT CHECK
13500 TR$=RIGHT$(STR$(TR),4)
13550 MT=CT(VAL(CT(0)))+TT$(2)
```

```
13600 IF MA=0 THEN MA="$###.##" ELSE MA=FNG$(FNG%(FNF$(MA#)))
13650 GOSUB 9900'PRINT CHECK STAMP
13700 IF FT THEN GOSUB 15850:TS=>:GOSUB 550
13750 GOTO 7250'-----END CHK APRVL RTN
13800 'SCR VARIATION
13850 D(0)=FNCA(3,9)+"WE ARE UNABLE TO PROCESS"+FNCA(5,16)+"YOUR CARD.":D(1)=SN:D(2)=SN
13900 D(3)=FNCA(9,13)+"PLEASE SEE YOUR"+FNCA(11,10)+"FINANCIAL INSTITUTION.":GOSUB 26050:RETURN
13950 D(0)=FNCA(1,6)+$D+"<== NCR 5062 ==>"+FNCA(2,3)+"CONSUMER ACTIVATED "+$D+"EFT"+$D+" TERMINAL":D
(1)=FNMU(4)+FNMU(5):D(2)=FNMU(6)+FNMU(7)
14000 D(3)=FNCA(14,4)+"SLIDE YOUR CARD THROUGH THE SLOT"+FNCA(15,7)+"TO BEGIN YOUR TRANSACTION":GOSUB 26050
B 26050:RETURN
14050 D(0)=FNCA(1,2)+"### PLEASE SELECT YOUR TRANSACTION ###"+FNCA(3,0)+"1 = WITHDRAW CASH"
"+FNCA(7,12)+"3 = NUM":D(1)=SN:D(2)=SN
14100 D(1)=FNCA(5,8)+"2 = APPROVE A CHECK"+FNCA(7,8)+"3 = GET BALANCE INFORMATION"
14150 D(2)=FNCA(9,8)+"4 = PRINT BONUS COUPON"
14200 D(3)=FNCA(13,5)+"ENTER YOUR TRANSACTION NUMBER ON"+FNCA(14,13)+"THE KEYPAD BELOW":GOSUB 26050:
RETURN
14250 D(0)=FNCA(1,6)+"### FROM WHICH ACCOUNT? ###"+FNCA(3,12)+"1 = CHECKING"+FNCA(5,12)+"2 = SAVINGS
"+FNCA(7,12)+"3 = NUM":D(1)=SN:D(2)=SN
14300 D(3)=FNCA(9,12)+"4 = VISA"+FNCA(11,12)+"5 = MASTERCARD"+FNCA(13,9)+"ENTER YOUR SELECTION ON"+F
NCA(14,13)+"THE KEYPAD BELOW":GOSUB 26050:RETURN
14350 D(0)=FNCA(1,7)+"### PLEASE SELECT AMOUNT ###"+FNCA(3,12)+"1 = $ 25.00"
14400 D(1)=FNCA(5,12)+"2 = $ 50.00"+FNCA(7,12)+"3 = $ 75.00"
14450 D(2)=FNCA(9,12)+"4 = $ 100.00"+FNCA(11,12)+"5 = OTHER AMOUNT"
14500 D(3)=FNCA(13,9)+"ENTER YOUR SELECTION ON"+FNCA(14,13)+"THE KEYPAD BELOW":GOSUB 26050:RETURN
14550 D(0)=NCA(1,1)+"### PLEASE ENTER THE AMOUNT YOU WANT ###"+FNCA(4,5)+"IF AMOUNT DISPLAYED IS CO
RRECT,":D(1)=SN:D(2)=SN
```

```
14600 D(3)=FNCA(6,10)+"PRESS THE ENTER KEY."+FNCA(10,4)+"(IF NOT CORRECT, PRESS 'CLEAR' KEY)":GOSUB
26050:RETURN
14650 D(0)=FNCA(1,4)+"*** PLEASE RE-ENTER YOUR AMOUNT ***"+FNCA(4,6)+"IF AMOUNT DISPLAYED IS CORRECT
,":D(1)=SN:D(2)=SN
14700 D(3)=FNCA(6,11)+"PRESS THE ENTER KEY."+FNCA(10,4)+"(IF NOT CORRECT, PRESS 'CLEAR' KEY)":GOSUB
26050:RETURN
14750 D(0)=FNCA(1,6)+"*** YOU REQUESTED MORE CASH ***"+FNCA(3,11)+"THAN HE CAN AUTHORIZE"+FNCA(4,4)+
"WOULD YOU LIKE A PRINTED RECORD OF":D(1)=SN:D(2)=SN
14800 D(3)=FNCA(9,4)+"YOUR AVAILABLE WITHDRAWAL AMOUNT?"+FNCA(12,18)+"1 = YES"+FNCA(14,18)+"2 = NO":
GOSUB 26050
14850 Q=SN:GOSUB 20750:US=Q:IF FO THEN ERROR 212
14900 J=INSTR(S2,US):IF J=0 THEN RE=RE+1:GOTO 14850
14950 IF J=1 THEN M(4)="WITHDRAWL":GOSUB 15100
15000 IF J=2 THEN FC=1
15050 RETURN
15100 FR=0:GOSUB 17100'INSERT FORM SCR
15150 M(0)=SN:M(1)="DATE "+MD+" TIME "+MC
15200 IF TR$<>"" THEN M(1)=M(1)+" TRAN "+TR$
15250 M(2)=SN:M(3)="YOUR "+M(4)+" LIMIT IS "+FN*($(MA*)
15300 M(4)=SN:M(5)=SM
15350 GOSUB 10300'PRINT
15400 IF FT THEN GOSUB 15850:TS=5:GOSUB 550
15450 RETURN
15500 D(0)=FNCA(1,2)+"*** PLEASE PASS YOUR CARD THROUGH ***"+FNCA(3,8)+"THE CARD SLOT TO YOUR LEFT":
D(1)=FNCA(10,24)+"BU"+FNCA(8,28)+"BU"+"NCK"+FNCA(12,28)+"BD"+"YOU"
15550 GOSUB 16350:RETURN
```

```
15600 D(0)=FNCA(1,5)+"*** WE ARE PROCESSING YOUR ***"+FNCA(3,7)+"TRANSACTION -- PLEASE WAIT":D(1)=FN
MP(0)+FNMP(1):D(2)=FNMP(2)+FNMP(3)
15650 D(3)=SN:GOSUB 26050:RETURN
15700 D(0)=FNCA(1,6)+"*** WE ARE SORRY WE CANNOT ***"+FNCA(3,9)+"PROCESS YOUR TRANSACTION.":D(1)=SN:
D(2)=SN
15750 D(3)=FNCA(7,9)+"PLEASE SEE STORE MANAGER"+FNCA(9,14)+"FOR ASSISTANCE":GOSUB 26050:RETURN
15800 D(0)=FNCA(1,2)+"*** YOUR TRANSACTION IS CANCELLED ***"+FNCA(3,13)+"AT YOUR REQUEST":D(1)=SN:D(
2)=SN:D(3)=SN:GOSUB 26050:RETURN
15850 D(0)=FNCA(1,3)+"*** YOU HAVE TAKEN TOO MUCH TIME ***"+FNCA(3,7)+"YOUR TRANSACTION IS CANCELLED
":D(1)=SN:D(2)=SN:D(3)=SN:GOSUB 26050:RETURN
15900 D(0)=FNCA(1,3)+"*** YOU HAVE TAKEN TOO MUCH TIME ***"+FNCA(5,6)+"PLEASE PASS YOUR CARD THROUGH
"+FNCA(7,11)+"THE CARD SLOT AGAIN":D(1)=SN:D(2)=SN:D(3)=SN:GOSUB 26050:RETURN
15950 D(0)=FNCA(1,6)+"*** YOU HAVE MADE TOO MANY ***"+FNCA(3,13)+"INCORRECT ENTRIES":D(1)=SN:D(2)=SN
:GOSUB 15750:RETURN
16000 DISPLAY #4,Z0,FNCA(16,1)+BL+BB+BB+"* * * PLEASE MAKE YOUR ENTRY NOW * * *":WAIT 44:RETURN
16050 D(0)=FNCA(1,3)+"*** PLEASE ENTER YOUR SECRET CODE ***"+FNCA(3,11)+"ON THE KEYPAD BELOW":D(1)=
SN:D(2)=SN
16100 D(3)=FNCA(5,7)+"THEN PRESS THE ENTER KEY"+FNCA(9,3)+"(IF YOU MAKE AN ERROR, PRESS 'CLEAR')":GO
SUB 26050
16150 GOSUB 19000:RETURN 'GET PIN ENTRY
16200 D(0)=FNCA(1,1)+"*** YOU ENTERED AN INVALID SECRET CODE ***":D(1)=FNCA(5,6)+"PLEASE RE-ENTER YOUR
CODE AND"+FNCA(7,11)+"PRESS THE 'ENTER' KEY"
16250 D(2)=FNCA(1,3)+"(IF YOU MAKE A ERROR, PRESS 'CLEAR')":D(3)=SN:GOSUB 26050:RETURN
16300 D(0)=FNCA(1,1)+"*** WE WERE UNABLE TO READ YOUR CARD ***"+FNCA(5,6)+"PLEASE PASS YOUR CARD THR
OUGH"+FNCA(7,12)+"THE SLOT AGAIN":D(1)=SN
16350 D(2)=FNCA(9,8)+"/——————————————"+FNCA(10,7)+"/*******************"+FNCA(11,1)+"*|
```

```
NCA(12,1)+"*1   /***/"
16400 D(3)=FNCA(13,1)+"***/***/"+FNCA(14,1)+"** ***/"+FNCA(15,1)+"** ***/"+FNCA(16,1)+"**********"
16450 "D(3)=D(3)+FNCA(12,30)+"MEM"+STR$(FRE(-1))+FNCA(13,30)+"SYM"+STR$(FRE(0))+FNCA(14,30)+"STR"+ST
RS(FRE(""))
16500 GOSUB 26050:RETURN
16550 D(0)=FNCA(1,1)+"*** WHICH ACCOUNT BALANCE DO YOU WANT?  ***"+FNCA(3,13)+"1 = CHECKING":D(1)=FNCA(
5,13)+"2 = SAVINGS"+FNCA(7,13)+"3 = NOW"
16600 D(2)=FNCA(9,13)+"4 = VISA"+FNCA(11,13)+"5 = MASTERCARD":D(3)=FNCA(13,13)+"6 = ALL ACCOUNTS"+FN
CA(15,1)+"ENTER YOUR SELECTION ON THE KEYPAD BELOW":GOSUB 26050:RETURN
16650 D(0)=FNCA(1,5)+"*** YOUR ACCOUNT BALANCE IS: ***"+FNCA(5,5)+AT(J)+SPACE$(25-LEN(AT(J)))+"BALANC
E":D(1)=SN
16700 EM=BAM(J):MA=FNES(EM)
16750 D(2)=FNCA(7,1)+AN(J)+FNMF(J)+MA+FNCA(9,5)+"DO YOU WANT A PRINTED RECORD?"
16800 D(3)=FNCA(11,17)+"1 = YES"+FNCA(12,17)+"2 = NO":GOSUB 26050:RETURN
16850 Q=SN:GOSUB 20750:US=Q:IF FU THEN ERROR 213
16900 J=INSTR(S2,US):IF J=0 THEN RE=RE+1:GOTO 16900
16950 IF J=1 THEN GOSUB 11500
17000 IF J=2 THEN FC=1
17050 RETURN
17100 D(0)=FNCA(6,4)+BE+BB+"*** PLEASE INSERT A BLANK FORM ***"+FNCA(H,8)+BE+"IN THE PRINTER ON THE
LEFT":D(1)=SN:D(2)=SN:D(3)=SN:GOSUB 26050:RETURN
17150 D(0)=FNCA(5,5)+"*** PLEASE REMOVE YOUR CHECK ***"+FNCA(7,4)+"OR SLIP FROM THE PRINTER":D(1)=FN
CA(10,3)+MM:D(2)=SN:D(3)=SN:GOSUB 26050:RETURN
17200 DISPLAY #4,20,FNCS+FNCA(1,4)+"*** YOUR ACCOUNT BALANCES ARE ***":WAIT #4
17250 FOR I=1 TO 5
17300 EM=BAM(I):MA=FNES(EM)
```

17350 DISPLAY #4,20,FNCA(62+1,1)+FNMD(I):WAIT #4
17400 NEXT I
17450 DISPLAY #4,20,FNCA(13,6)+"DO YOU WANT A PRINTED RECORD?"+FNCA(14,11)+"ENTER 1 FOR YES"+FNCA(15,14)+"OR 2 FOR NO"+FNCE:WAIT #4
17500 U=SN:GOSUB 20750:US=0:IF FU THEN ERROR 215
17550 J=INSTR(S2,U$):IF J=0 THEN RE=RE+1:GOTO 17500
17600 IF J=1 THEN GOSUB 11500
17650 IF J=2 THEN FC=1
17700 RETURN
17750 D(0)=FNCA(1,7)+"* WHAT TYPE OF CHECK? *"+FNCA(3,2)+"1 = PERSONAL CHECK FOR CASH":D(1)=FNCA(5,2)+"2 = PERSONAL CHECK FOR PURCHASE AMOUNT"+FNCA(7,2)+"3 = PERSONAL CHECK WITH CASH BACK"
17800 D(2)=FNCA(9,2)+"4 = PAYROLL CHECK"+FNCA(11,2)+"5 = GOVERNMENT CHECK":D(3)=FNCA(13,2)+"ENTER YOUR SELECTION ON"+FNCA(14,12)+"THE KEYPAD BELOW":GOSUB 26050:RETURN
17850 D(0)=SN:D(1)=FNCA(5,1)+"* PLEASE ENTER AMOUNT OF CHECK OR *"+FNCA(7,5)+"CASH BACK ON THE KEYPAD BELOW."
17900 D(2)=FNCA(9,7)+"THEN PRESS THE 'ENTER' KEY.":D(3)=SN:GOSUB 26050:RETURN
17950 D(0)=FNCA(1,2)+"* THE AMOUNT YOU ENTERED EXCEEDS *"+FNCA(3,6)+"YOUR AUTHORIZATION LIMIT"":D(2)=FN
MIT"
18000 D(1)=FNCA(6,7)+"DO YOU WANT A PRINTED RECORD"+FNCA(8,7)+"OF YOUR CHECK AUTHORIZATION LIMIT?":D(2)=FN
CA(10,17)+"1 = YES"+FNCA(12,17)+"2 = NO":D(3)=SN:GOSUB 26050
18050 U=SN:GOSUB 20750:US=0:IF FU THEN ERROR 215
18100 J=INSTR(S2,U$):IF J=0 THEN RE=RE+1:GOTO 18050
18150 IF J=1 THEN M(4)="CHECK CASHING":GOSUB 15100
18200 IF J=2 THEN FC=1
18250 RETURN
18300 D(0)=FNCA(1,5)+3E+88+"* PLEASE INSERT YOUR CHECK *"+FNCA(3,10)+BE+"IN PRINTER ON THE LEFT"

```
18350 D(1)=FNCA(5,11)+"I"+STRING$(24,45)+"I"+FNCA(6,11)+"I"+SPACES(24)+"I"+FNCA(7,3)+"I
LANK SIDE OF         I"+FNCA(8,2)+"I"
18400 D(2)=FNCA(9,1)+"<*******  I       CHECK MUST         I"+FNCA(10,2)+"\-----   I"+SPACE$(24)+"I"+FNCA(7,3)+"I
NCA(11,3)+"\
18450 D(3)=FNCA(13,11)+"I"+STRING$(24,45)+"I"+FNCA(12,11)+"I"+SPACE$(24)+"I":GOSUB 26050:RETURN
                    I    FACE YOU
18500 D(0)=SN:D(1)=FNCA(5,6)+"XXX    XXXX XXXX XXX"+FNCA(6,5)+"X   X X XXXX XXX   X   X
 X  X"+FNCA(7,5)+"X      X       X    X"+FNCA(8,5)+"X       X    X XXXX XXX   X   X
18550 D(2)=FNCA(9,5)+"X    X X    X   X     X"+FNCA(10,6)+"XXX   XXXXX    XXX    XXXX  XXX
18600 D(3)=FNCA(13,2)+"THIS TERMINAL WILL REOPEN AT 8:00 AM":GOSUB 26050:RETURN
18650 D(0)=FNCA(11,1)+BR(0)+FNCA(11,11)+"KEYBOARD IN EFFECT"
18700 D(1)=FNCA(12,2)+BK(1)+"123 "+BR(2)+"ABC "+BR(3)+"JKL "+BR(4)+"STU "+BR(5)+"[=] "+BR(6)+"+- "+
BR(7)+BR(0)+"SHIFT-> "
18750 D(2)=FNCA(13,2)+BR(1)+"456 "+BR(2)+"DEF "+BR(3)+"MNO "+BR(4)+"VWX "+BR(5)+"LZ "+BR(6)+"*,/  "+
BR(7)+BR(0)+"<-SHIFT "
18800 D(3)=FNCA(14,2)+BR(1)+"789 "+BR(2)+"GHI "+BR(3)+"PQR "+BR(4)+"YZ  "+BR(5)+"() "+BR(6)+";:  "+
+BR(7)+BR(0)+" ENTER "
18850 D(3)=D(3)+FNCA(15,3)+BR(1)+"0 "+B5+"  <-    ->       \         FUNCTION"+FNCA(1,3)+"CLRSCN
EL INS CLEAR"
18900 RETURN
18950 '-----PIN ENTRY RTN
19000 FB=0:FP=0:FT=0:L=0:QA=SN:0S=SN:LOCATE 14,32:PRINT SPC(6)
19050 ACCEPT #2,ZK,QA
19100 TS=10:GOSUB 800:GOSUB 20550
19150 IF RE>PL THEN F=1:TS=5:GOSUB 550:GOTO 19600
19200 IF FB=1 AND FT=1 THEN FB=0:GOTO 19600
```

```
19250 IF FT=1 THEN RE=RE+1:FB=0:FT=0:GOSUB 16000:GOTO 19050
19300 IF QA=CA THEN FA=1:GOTO 19600
19350 IF QA=CL THEN GOTO 19000
19400 IF QA=ENS AND L<PM THEN RE=RE+1:GOSUB 16200:GOTO 19000
19450 IF QA<>ENS AND L<PN THEN US=QS+QA:L=LEN(QS):LOCATE 14,32:DISPLAY #4,20,STRING$(LEN(QS),""):WA
IT #4:GOTO 19050
19500 IF QA=ENS AND L<=PN THEN RE=RE+1:GOSUB 16200:GOTO 19000
19550 IF PE$<>PNS THEN RE=RE+1:GOSUB 16200:GOTO 19000
19600 FU=FA OR FE OR FT OR FS OR FP
19650 RETURN
19700 '----- AMT ENTRY RTN
19750 FB=0:FT=0:L=0:QA=SN:QS=SN:LOCATE 14,31:PRINT "$###.##"
19800 ACCEPT #2,ZK,QA
19850 TS=10:GOSUB 800:GOSUB 20050
19900 IF RE>EL THEN RE=0:FT=1:TS=5:GOSUB 550:GOTO 20300
19950 IF FB=1 AND FT=1 THEN FB=0:GOTO 20300
20000 IF FT=1 THEN RE=RE+1:FB=0:FT=0:GOSUB 16000:GOTO 19800
20050 IF QA=CA THEN FA=1:GOTO 19750
20100 IF QA=CL THEN GOTO 19750
20150 IF QA=ENS AND L<EN THEN RE=RE+1:GOSUB 16650:GOTO 19750
20200 IF QA<>ENS AND L<EN THEN QS=QS+QA:L=LEN(QS):GOSUB 20400:GOTO 19800
20250 IF QA=ENS AND L<=EN THEN NA$=VAL(QS)/100 ELSE RE=RE+1:GOTO 19800
20300 FU=FA OR FE OR FS OR FT OR FP
20350 RETURN
20400 QD=ENCODE$(ME,VAL(QS)/100)
20450 LOCATE 14,32:DISPLAY #4,20,QD:WAIT #4
```

```
20500 RETURN
20550 DISPLAY #3,2A,"":WAIT #3'ABORT KYBD
20600 IF STATUS THEN FS=1
20650 IF FC=0 THEN WAIT #2
20700 RETURN
20750 FB=0:FT=0'----GET ACTIVATOR RTN
20800 ACCEPT #2,ZK,Q
20850 IF FB=0 THEN TS=10 ELSE TS=20
20900 GOSUB 800:GOSUB 20550'ABORT
20950 IF FB=1 AND FT=1 THEN FB=0:GOTO 21150
21000 IF FT=1 THEN GOSUB 16000:FB=1:FT=0:GOTO 20800
21050 IF Q=CA THEN FA=1
21100 IF QE>5 THEN FE=1
21150 FU=FA OR FE OR FS OR FT OR FP
21200 RETURN
21250 GOSUB 16050:IF FO THEN ERROR 216'MGR PIC
21300 D(0)=FNCA(2,11)+"--- MANAGER MENU ---"+FNCA(5,6)+"1 = TRANSACTION LIMIT OVERRIDE"+FNCA(6,6)+"2 = ENTER EXCEPTION ITEMS"+FNCA(7,6)+"3 = CLOSE TERMINAL-PRINT TOTALS"+FNCA(8,6)+"4 = ENTER EXCEPTION ITEMS"+FNCA(9,6)+"5
= OPEN TERMINAL-RESET TOTALS"
21350 D(1)=FNCA(7,6)+"3 = CLOSE TERMINAL-PRINT TOTALS"+FNCA(10,6)+"6 = ACTIVATE NEW CARD"
6)+"5 = ENTER STORE SPECIALS"+FNCA(11,6)+"7 = DISPLAY SERVICE MENU"+FNCA(12,6)+"8 = DEMO SETUP OFFLINE ONLY)"+FNCAL1),
21400 D(2)=FNCA(11,6)+"7 = DISPLAY SERVICE MENU"+FNCA(12,6)+"8 = DEMO SETUP OFFLINE ONLY)"+FNCAL1),
6)+"9 = END"$D(3)=SN
21450 GOSUB 26050
21500 Q=SN:GOSUB 20750:IF FO THEN ERROR 217
21550 J=INSTR(SN,Q):IF J=0 THEN RETURN
21590 REM      OVRIDE OPEN CLOSE XITMS SPECL NEW  SVC  DEMO
```

```
21600 ON J GOSUB 24200,24300,24500,24550,24600,27000,24600,24700,21750
21650 GOTO 21300
21700 '** DEMO SETUP
21750 D(0)=FNCA(2,7)+"*** DEMONSTRATION SETUP ***":D(1)=FNCA(5,7)+"1 = CHANGE WELCOME SCREEN"+FNCA(
,7)+"2 = CHANGE RECEIPT LINES 1,2&6"
21800 D(2)=FNCA(9,7)+"3 = CHANGE DATE, TIME, ETC."+FNCA(11,7)+"4 = END SETUP FUNCTION"
21850 D(3)=FNCA(13,2)+"-->ALWAYS RUN ONE OF EACH TYPE OF"+FNCA(14,5)+"TRANSACTION TO VERIFY CORRECTN
ESS"+FNCA(15,5)+"OF ANY CHANGE YOU MAKE":GOSUB 26050
21900 Q=SN:GOSUB 20750:IF FU THEN ERROR 221
21950 J=INSTR(S3,Q):IF J=0 THEN RETURN
22000 ON J GOSUB 24000,24300,22100'WELCOME,RECEIPT,OTHER CHANGES
22050 GOTO 21750
22100 GOSUB 23650'-----DEMO SETUP RTN
22150 KR=7:KC=34:KL=6:GOSUB 25800
22200 IF Q=EN$ THEN 22350 ELSE IF Q<>CL THEN 22150
22250 GOSUB 25350:MD$=LEFT$(U$,2)+"/"+MID$(U$,3,2)+"/"+RIGHT$(U$,2)
22300 DISPLAY #4,20,FNCA(7,23)+MD$+SPACES(10):WAIT #4
22350 KR=8:KL=4:GOSUB 25800
22400 IF Q=EN$ THEN 22550 ELSE IF Q<>CL THEN 22350
22450 GOSUB 25350:TR=VAL(Q$)
22500 DISPLAY #4,20,FNCA(8,27)+U$+SPACES(10):WAIT #4
22550 KR=9:GOSUB 25800
22600 IF Q=EN$ THEN 22750 ELSE IF Q<>CL THEN 22550
22650 GOSUB 25350:MC=LEFT$(U$,2)+":"+RIGHT$(U$,2)
22700 DISPLAY #4,20,FNCA(9,26)+MC+SPACES(10):WAIT #4
22750 KR=10:KL=5:GOSUB 25800
```

```
22800 IF Q=ENS THEN 22950 ELSE IF U<>CL THEN 22750
22850 GOSUB 25350:HL#=VAL(US)/100
22900 DISPLAY #4,ZD,FNCA(10,25)+ENCODE$(ME,HL#)+SPACE$(10):WAIT #4
22950 KR=11:KL=4:GOSUB 25800
23000 IF Q=ENS THEN 23150 ELSE IF U<>CL THEN 22950
23050 GOSUB 25350:NUS=US
23100 DISPLAY #4,ZD,FNCA(11,27)+NUS+SPACE$(10):WAIT #4
23150 KR=12:KL=5:GOSUB 25800
23200 IF Q=ENS THEN 23350 ELSE IF U<>CL THEN 23150
23250 GOSUB 25350:HL#=VAL(US)/100
23300 DISPLAY #4,ZD,FNCA(12,25)+ENCODE$(ME,HL#)+SPACE$(10):WAIT #4
23350 KR=13:KL=4:GOSUB 25800
23400 IF Q=ENS THEN 23550 ELSE IF U<>CL THEN 23350
23450 GOSUB 25350:PNS=US
23500 DISPLAY #4,ZD,FNCA(13,27)+PNS+SPACE$(10):WAIT #4
23550 KR=16:KC=37:GOSUB 25800
23600 IF Q=ENS THEN RETURN ELSE 22100
23650 D(0)=FNCA(1,7)+"*** DEMONSTRATION SET-UP ***"+FNCA(3,1)+"TO CHANGE ANY OF THE DISPLAYED DATA P
USH THE 'CLEAR' KEY AND ENTER NEW DATA."
23700 D(1)=FNCA(5,1)+"TO SKIP TO NEXT DATA ITEM PUSH 'ENTER'."+FNCA(7,2)+"DATE (MM/DD/YY)     $"+ENCODE$(ME,DT#)+
FNCA(8,2)+"TRANSACTION NUMBER      "+STR$(TX)
23750 D(2)=FNCA(9,2)+"TIME (HH:MM)"+FNCA(9,26)+MC+FNCA(10,2)+"OFFLINE CHECK LIMIT   $"+ENCODE$(ME,HL#)
#)+FNCA(11,2)+"TODAY'S AUDIT NUMBER     "+NDS+FNCA(12,2)+"CASH WITHDRAWL LIMIT   $"+ENCODE$(ME,HL#)
23800 D(3)=FNCA(13,2)+"DEMO PIN NUMBER"+FNCA(13,27)+PNS+FNCA(15,2)+"PUSH 'CLEAR' TO MAKE MORE CHANGE
S        PUSH 'ENTER' IF DATA IS CORRECT"
23850 GOSUB 26050
```

```
23900 RETURN
23950 '** CHANGE WELCOME SCREEN
24000 GOSUB 18650:D(0)=FNCA(1,5)+"EDIT HOME SCREEN MESSAGES BELOW:"+D(0):GOSUB 26050
24100 KC=5:KL=32:KR=3:KB=4:KE=7
24150 GOSUB 27200:RETURN
24200 RETURN
24250 '** CHG RECEIPT LINES
24300 GOSUB 18650:D(0)=FNCA(1,6)+"EDIT RECEIPT LINES 1,2&6 BELOW"+D(0):GOSUB 26050
24400 KC=5:KL=29:KR=3:KB=8:KE=10
24450 GOSUB 27200:RETURN
24500 DISPLAY #4,ZD,FNCA(15,1)+"TERMINAL WILL OPEN UPON LEAVING THE"+FNCA(16,1)+"MANAGER MENU":WAIT
#4:TS=5:GOSUB 550:F0=0:RETURN
24550 DISPLAY #4,ZD,FNCA(15,1)+"TERMINAL WILL CLOSE UPON LEAVING THE"+FNCA(16,1)+"MANAGER MENU":WAIT
#4:TS=5:GOSUB 550:F0=1:RETURN
24600 RETURN
24650 '** DISPLAY SERVICE MENU
24700 D(0)=FNCA(2,10)+"** SERVICE MENU ***":J(1)=FNCA(5,7)+"1 = ENTER DIAGNOSTICS"+FNCA(7,7)+"2 = T
ERMINAL-TO-TERMINAL LOAD"
24750 D(2)=FNCA(9,7)+"3 = START UPSTREAM DUMP"+FNCA(11,7)+"4 = END SERVICE FUNCTION":D(3)=SN:GOSUB 2
6050
24800 U=SN:GOSUB 20750:IF FU THEN ERROR 222
24850 J=INSTR(S3,U):IF J=0 THEN RETURN
24900 OPEN "9:" AS #9 RECSIZE 42 UTIL MOD
24950 IF STATUS THEN PRINT "STAT=";STATUS:STOP
25000 OPEN "9:" AS #10 RECSIZE 0,ABORT
25050 IF STATUS THEN PRINT "STAT=";STATUS:STOP
```

```
25100 ON J GOSUB 29050,25210,25210 "DIAG,LOAD,DUMP
25150 CLOSE #9,#10
25200 GOTO 24700
25210 LOCATE 16,1:PRINT "DEMO CANNOT PERFORM ONLINE FUNCTIONS":TS=5:GOSUB 550:RETURN
25250 '-----GET DATA RTN
25300 'INPUT:KR=ROW;KC=COLUMN;KL=LENGTH
25350 L=0:UA=SN:QS=SN
25400 DISPLAY #4,ZD,FNCA(KR,KC-1)+BE+"?"+STRING$(KL,42):WAIT #4
25450 ACCEPT #2,ZK,JA:WAIT #2
25500 IF JA=CL THEN 25350
25550 QS=QS+UA:L=LEN(QS)
25600 DISPLAY #4,ZD,FNCA(KR,KC)+QS:WAIT #4
25650 IF L<KL THEN 25450
25700 RETURN
25750 '-----PROMPT FOR ACTIVATOR
25800 DISPLAY #4,ZD,FNCA(KR,KC-2)+BL+"?"+CHR$(15)+CHR$(0):WAIT #4
25850 ACCEPT #2,ZK,U:WAIT #2
25900 IF U=EN$ THEN DISPLAY #4,ZD,FNCA(KR,KC-1)+SPACE$(1):WAIT #4
25950 RETURN
26000 '-----SCR OUTPUT RTN
26050 DISPLAY #4,ZD,FNCS:WAIT #4 "CLR SCR & DROP BUFFERED KYBD DATA
26100 ACCEPT #2,ZK,ZS:JT=1
26150 IF CMPL(I#2) THEN 26100
26200 JT=JT+1:IF JT<>5 THEN 26150 ELSE FC=0:GOSUB 20050
26250 DISPLAY #4,ZD,D(0):WAIT #4
26300 IF D(1)<>SN THEN DISPLAY #4,ZD,D(1):WAIT #4
```

```
26350 IF D(2)<>SN THEN DISPLAY #4,Z0,D(2):WAIT #4
26400 DISPLAY #4,Z0,D(3)+FNCE:WAIT #4
26450 RETURN
26500 ***PRINT BONUS COUPON
26550 FR=0:GOSUB 17100
26600 M(0)=SN:M(1)=D2+"*** BONUS COUPON ***"
26650 M(2)=SN:M(3)="         FLUFFY SHORTENING  "+D2+"$.50 OFF"
26700 M(4)=SN:M(5)=D2+STRING$(20,42)
26750 GOSUB 10300'PRINT COUPON
26800 IF FT THEN GOSUB 15850:TS=5:GOSUB 550
26850 GOTO 7250
26900 *** END BONUS PRINT
26950 ***ENTER STORE SPECIALS
27000 GOSUB 10650:D(0)=FNCALL(5)+"ENTER PROMOTIONAL MESSAGES BELOW"+D(0):GOSUB 26050'PROMPT INPUT SCR
27100 KC=5:KL=32:KR=3:KB=0:KE=3
27150 GOSUB 27200:RETURN
27200 FOR KP=KB TO KE
27250 GOSUB 27500
27300 IF FU THEN KP<KE
27350 KR=KR+2
27400 NEXT KP
27420 IF FG<>0 THEN BR(FG)=BS
27430 FG=1:BR(FG)=BR(0)
27450 RETURN
27500 OS=TRANS(MP(KP),D2+U3+BF+B2+B0,"()=LEFT$(OS,KL):GOTO 27650
```

```
27550 US=SN
27650 PA=KC'SET PTR
27700 DISPLAY #4,ZD,FNCA(KR,KC)+US+STRING$(KL-LEN(OS),46):WAIT #4
27750 DISPLAY #4,ZD,FNCA(KR+1,KC)+SPACE$(KL)+FNCA(KR+1,PA)+"_":WAIT #4
27850 ACCEPT #2,ZK,OA:WAIT #2
27900 IF RE>0 THEN FE=1:GOTO 28800 ELSE RE=0
27950 IF OA=EN$ THEN 28850
28000 IF JA=SL THEN BR(FG)=US:IF FG=1 THEN FG=0 ELSE FG=FG-1
28050 IF JA=SR THEN BR(FG)=BS:IF FG=0 THEN FG=1 ELSE FG=FG+1
28100 IF OA=SL OR OA=SR THEN BR(FG)=BR(0):GOSUB 18700:GOSUB 26300 : GOTO 27850'REDISP KY,SO
28150 IF INSTR(SO,OA) THEN ELSE 27850
28200 I=(FG-1)*10+VAL(OA)+1
28250 JA=MID$(K$,I,1)
28300 IF JA=CL THEN 27550
28350 IF OA=IN$ THEN IF LEN(OS)<KL THEN OS=LEFT$(OS,PA-KC)+" "+MID$(OS,PA-KC+1):GOTO 27700 ELSE OS=L
EFT$(OS,PA-KC)+" "+MID$(OS,PA-KC+1,LEN(OS)-PA-KC-1):GOTO 27700
28400 IF JA=DE THEN OS=LEFT$(OS,PA-KC)+MID$(OS,PA-KC+2):GOTO 27700
28450 IF JA=AL THEN IF PA>KC THEN PA=PA-1:GOTO 27750 ELSE PA=KL+KC-1:GOTO 27750
28500 IF JA=AR THEN IF PACKL+KC-1 THEN PA=PA+1:GOTO 27750 ELSE PA=KC:GOTO 27750
28550 IF PA-KC+1>LEN(OS) THEN OS=US+SPACE$(PA-KC+1-LEN(OS))
28600 MID$(OS,PA-KC+1,1)=OA
28650 DISPLAY #4,ZD,FNCA(KR,PA)+OA:WAIT #4
28700 'PA=PA+1
28750 IF PACKL+KC-1 THEN PA=PA+1:GOTO 27750 ELSE PA=KC:GOTO 27750
28800 FU=FE
28850 IF FU=0 THEN MP(KP)=TRAN$(OS,"()=[]",O2+O3+BF+B2+BO)
```

```
28900 DISPLAY #4,20,F*CA(KR+1,KC)+SPACE$(KL):WAIT #4
28950 RETURN
29000 *** SERVICE MENU FUNCTIONS
29050 LPRINT CHR$(10):DISPLAY #9,"E401","""DIAG
29100 PRINT "ENTER TERMINAL # (1-12) TO RECEIVE LOAD"
29150 INPUT "ENTER 13 FOR BROADCAST"; I
29200 IF I<1 OR I>13 THEN INPUT "ERROR - ENTER VALUE 1-13"; I:GOTO 29200
29250 ACCEPT #9,"E105",A$:WAIT #9
29300 A$=A$+CHR$(255)+CHR$(I)+SPACE$(6)+LB$
29350 IF STATUS THEN PRINT "STAT=";STATUS:STOP
29400 DISPLAY #9,"E103",A$:WAIT #9
29450 IF STATUS=0 THEN RETURN
29500 PRINT "* * *   TERMINAL LOAD FAILURE    * * *":PRINT "STATUS=";STATUS
29550 INPUT "PRESS ANY KEY TO RESTART";A$
29600 RETURN
29650 ACCEPT #9,"E105",A$:WAIT #9
29700 A$=A$+MKI$(4112)+SPACE$(6)+LB$
29710 OPEN "3:" AS #13 RECSIZE 255
29715 IF STATUS THEN PRINT "STAT="; STATUS:STOP
29720 DISPLAY #13,"E430","":WAIT #13
29725 IF STATUS THEN PRINT "STAT=";STATUS:STOP
29730 DISPLAY #13 AND -52 THEN PRINT "STAT=";STATUS:STOP
29735 IF STATUS THEN PRINT "STAT=";STATUS:STOP
29750 DISPLAY #9,"E102",A$
29760 IF NOT CMPLT(#9) THEN FOR J=1 TO 500:NEXT J:I=I+1:LOCATE 16,30:PRINT I::GOTO 29750
29800 IF STATUS THEN PRINT " * *  UPSTREAM JUMP STATUS=";STATUS:INPUT "PRESS ANY KEY TO RESTART";A$
```

```
29840 CLOSE #13
29850 RETURN
29900 REM
29950 REM ROUTINE TABLE OF CONTENTS
30000 GOTO 400 'SOFTWARE IDENTIFICATION
30050 GOTO 550 'HIGH ORDER SIM TIMER
30100 GOTO 600 'MSR TIMER
30150 GOTO 800 'KEYBOARD TIMER
30200 GOTO 1000 'PROGRAM INITIALIZATION
30250 GOTO 7250 'TRANSACTION INITIALIZATION
30300 GOTO 8300 'WITHDRAWL ROUTINE
30350 GOTO 10300 'RECEIPT PRINT ROUTINE
30400 GOTO 10900 'ACCT BALANCE INQUIRY ROUTINE
30450 GOTO 12700 'CHECK APPROVAL ROUTINE
30500 GOTO 13950 'ALTERNATE HOME SCREEN
30550 GOTO 14050 'TRANSACTION SELECTION
30600 GOTO 14250 'MOL ACCT SELECTION
30650 GOTO 14350 'MOL FIXD AMT SEL
30700 GOTO 14550 'AMT ENTRY
30750 GOTO 14650 'REENTER AMT
30800 GOTO 14750 'EXCEEDS AMT AVAIL
30850 GOTO 15500 'HOME SCREEN
30900 GOTO 16050 'MANAGER PIN ENTRY
30950 GOTO 15600 'PLEASE WAIT MSG
31000 GOTO 15850 'TIME-OUT
```

```
31050 GOTO 15950 'TOO MANY INCORRECT ENTRIES
31100 GOTO 16000 'PROMPT AFTER TIME-OUT
31150 GOTO 16050 'PIN ENTRY
31200 GOTO 16200 'INVALID PIN ENTERED
31250 GOTO 17100 'INSERT FORM
31300 GOTO 18300 'INSERT CHECK
31350 GOTO 18500 'CLOSED SCREEN
31400 GOTO 19000 'PIN ENTRY ROUTINE
31450 GOTO 19750 'AMOUNT ENTRY ROUTINE
31500 GOTO 20750 'GET ACTIVATOR ROUTINE
31550 GOTO 21250 'MANAGER ROUTINE
31600 GOTO 24700 'SERVICE MENU
31650 GOTO 26050 'SCREEN OUTPUT ROUTINE
31700 GOTO 26550 'PRINT BONUS COUPON
31750 GOTO 27000 'STORE SPECIALS ROUTINE
31800 GOTO 27200 'TEXT EDIT LOOP
31850 GOTO 27500 '13-KEY ALPHANUMERIC DATA ENTRY ROUTINE
31900 '
31950 '
32000 'THIS SUBROUTINE WILL PRINT MS$ IN BOTH CHARACTER AND HEX
32050 '
32100 ' TO USE IT SWAP MS$,STRING YOU WANT TO PRINT THEN ENTER
32150        GOSUB 32300
32200 '
32250 '
32300 GOSUB 33100
```

```
32350 FOR I=1 TO LEN(M$)
32400 M1$=MID$(M$,I,1)
32450 K0=ASC(M1$):K1=K0 DIV 16:K4=K0-16*K1
32500 IF K0>31 AND K0<96 THEN O1$=O1$+M1$ ELSE O1$=O1$+" "
32550 O2$=O2$+MID$(S1$,K1+1,1)
32600 O3$=O3$+MID$(S1$,K4+1,1)
32650 J=J+1
32700 IF J=32 THEN GOSUB 32900
32750 NEXT I
32800 IF O1$<>"" THEN GOSUB 32900
32850 RETURN
32900 PRINT O1$
32950 PRINT O2$
33000 PRINT O3$
33050 PRINT
33100 J=0:O1$="":O2$="":O3$=""
33150 S1$="0123456789ABCDEF":RETURN
33200 REM
33250 REM
40000 FOR J=1 TO 500:NEXT J:I=I+1:LOCATE 16,3J:PRINT 1;:GOTO 40000
```

What is claimed is:

1. A process for entering and editing character data being comprised of a predetermined number of characters using an entry terminal having a display and also having a keyboard having a predetermined number of character entry keys presented in a first array and a predetermined number of function keys, with said predetermined character entry keys being fewer in number than said predetermined number of characters; said process comprising the steps:

(a) presenting on said display more than one cluster of characters to be selected, with each said cluster containing fewer than said predetermined number of characters, and with at least some of said clusters of characters having a function symbol included therein, each said function symbol corresponding to an editing function for use in editing said character data; each said cluster of characters and said function symbol when included therein being presented on said display in a second array for selection;

(b) selecting, via a said function key, that one of said clusters of characters which contains the character to be entered via said terminal or which contains the function symbol desired for editing;

(c) actuating one of said character entry keys whose position in said first array bears a predetermined relationship to the position in said second array held by the character to be entered or the said function symbol desired to be entered for use in editing;

said first and second arrays corresponding to each other and said actuating step comprising selecting that one of said character entry keys in said first array which occupies the same position in said first array as the character or function symbol to be selected occupies in said second array;

said clusters of characters being aligned along a line on said display and said selecting step comprising sequentially making active on said display said clusters of characters and function symbols when included therein when moving in a first direction along said line until said cluster which contains the character or the function symbol to be entered is reached using a first said function key, and said selecting step also comprising sequentially making active on said display said clusters of characters and function symbols when included therein when moving in a second direction opposite to said first direction along said line until said cluster which contains the character or the function symbol to be entered is reached using a second said function key;

said editing comprising using a first one of said function symbols for moving a cursor to the left along a line of characters on said display; using a second one of said function symbols for moving said cursor to the right along said line of characters on said display; using a third one of said function symbols for deleting a said character shown on said line of characters on said display; using a fourth one of said function symbols for inserting a space in said line of characters shown on said display; and using a fifth one of said function symbols for clearing a said line of characters shown on said display;

said presenting step comprising using at least first, second, third, fourth, fifth, and sixth said clusters of characters with ten characters namely zero through nine being included in said first cluster and with said first, second, third, fourth, and fifth said function symbols being included, respectively, in said second, third, fourth, fifth and sixth said clusters of characters.

* * * * *